（12) United States Patent
Lee

(10) Patent No.: US 9,927,904 B2
(45) Date of Patent: Mar. 27, 2018

(54) CAPACITIVE TYPE TOUCH DETECTION MEANS AND DETECTION METHOD

(71) Applicant: G2TOUCH Co., LTD., Seongnam (KR)

(72) Inventor: Sung Ho Lee, Hwaseong (KR)

(73) Assignee: G2TOUCH CO., LTD., Seongnam (KR)

( * ) Notice: Subject to any disclaimer, the term of this patent is extended or adjusted under 35 U.S.C. 154(b) by 253 days.

(21) Appl. No.: 14/783,400

(22) PCT Filed: Apr. 8, 2014

(86) PCT No.: PCT/KR2014/003034
§ 371 (c)(1),
(2) Date: Oct. 8, 2015

(87) PCT Pub. No.: WO2014/168399
PCT Pub. Date: Oct. 16, 2014

(65) Prior Publication Data
US 2016/0054846 A1    Feb. 25, 2016

(30) Foreign Application Priority Data
Apr. 8, 2013   (KR) ........................ 10-2013-0038160

(51) Int. Cl.
*G06F 3/045*    (2006.01)
*G06F 3/041*    (2006.01)
*G06F 3/044*    (2006.01)

(52) U.S. Cl.
CPC ............ *G06F 3/0416* (2013.01); *G06F 3/044* (2013.01); *G06F 3/0418* (2013.01); *G06F 2203/04112* (2013.01)

(58) Field of Classification Search
CPC ...... G06F 3/0416; G06F 3/0418; G06F 3/044; G06F 2203/04112
See application file for complete search history.

(56) References Cited

U.S. PATENT DOCUMENTS

2007/0124674 A1   5/2007 Liao et al.
2010/0065341 A1   3/2010 Jeon
(Continued)

FOREIGN PATENT DOCUMENTS

EP          2 624 109 A2    8/2013
KR    10-2011-0042676 A    4/2011
(Continued)

OTHER PUBLICATIONS

Extended European Search Report for European Patent Application No. 14782977.4, dated Nov. 25, 2016.
(Continued)

*Primary Examiner* — Peter D McLoone

(57) ABSTRACT

Disclosed herein are a capacitive type touch detection means and a detection method using a new scheme, which detects a touch signal using a difference between voltage magnitudes detected by a touch detector according to whether a touch is generated, when an alternating voltage is applied to a line equivalent capacitor formed between a sensing pad which is detecting a touch signal and a non-sensing pad adjacent to the sensing pad. The touch detection means includes: a sensing pad configured to generate the touch capacitance Ct between a sensing pad and the touch input means; an alternating voltage configured to be applied to a line equivalent capacitor Ceq formed between the sensing pad and a non-sensing pad adjacent to the sensing pad; and a touch detector connected to the sensing pad to detect a difference in voltage generated according to whether the touch is generated by the touch input means.

18 Claims, 15 Drawing Sheets

(56) References Cited

U.S. PATENT DOCUMENTS

| | | |
|---|---|---|
| 2012/0043973 A1 | 2/2012 | Kremin |
| 2012/0092288 A1 | 4/2012 | Wadia |
| 2012/0113047 A1* | 5/2012 | Hanauer ............... G06F 3/0416 345/174 |
| 2012/0249457 A1* | 10/2012 | Chou ..................... G06F 3/044 345/173 |
| 2013/0314373 A1* | 11/2013 | Kim ....................... G06F 3/044 345/174 |
| 2014/0232691 A1 | 8/2014 | Lee |

FOREIGN PATENT DOCUMENTS

| | | |
|---|---|---|
| WO | WO 2012/005483 A2 | 1/2012 |
| WO | WO 2012/121517 A2 | 9/2012 |

OTHER PUBLICATIONS

International search report for PCT/KR2014/003034 filed on Apr. 8, 2014.

* cited by examiner

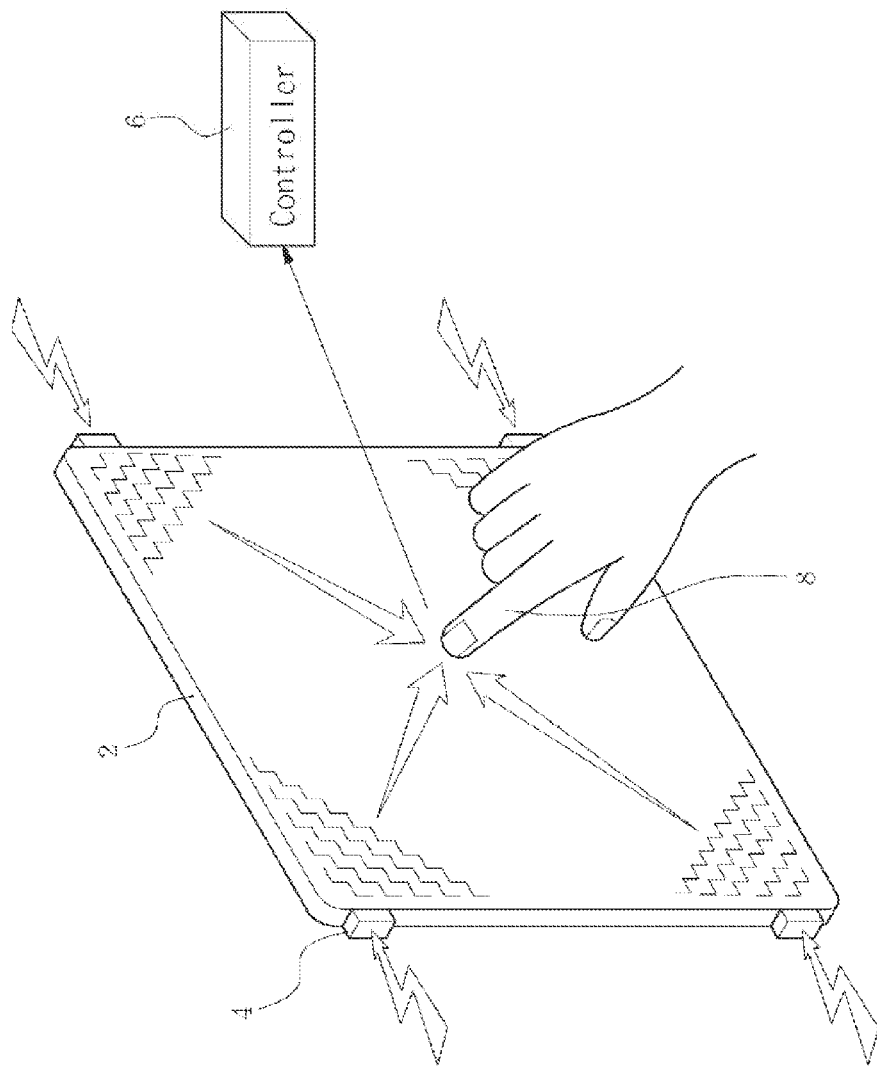
[FIG. 1]
[Prior Art]

[FIG. 2]
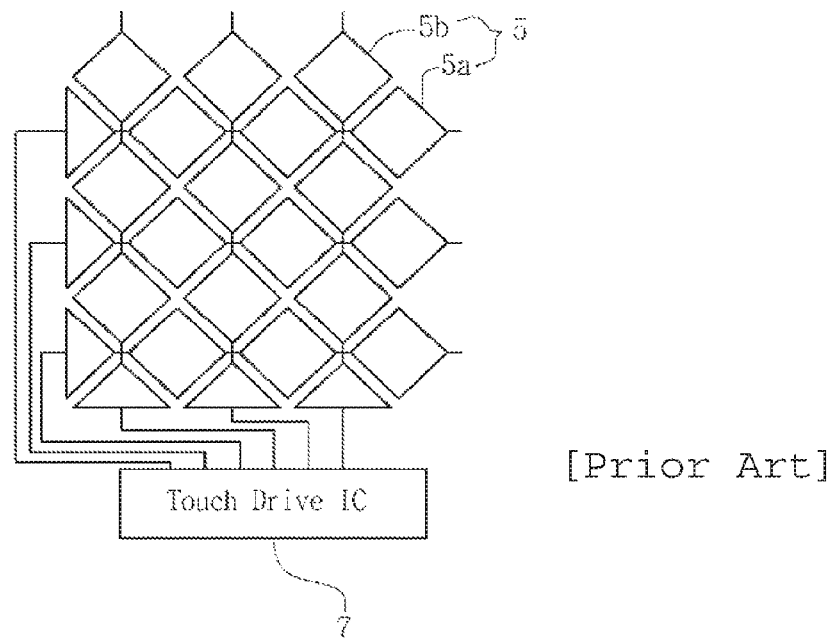
[Prior Art]
[FIG. 3]
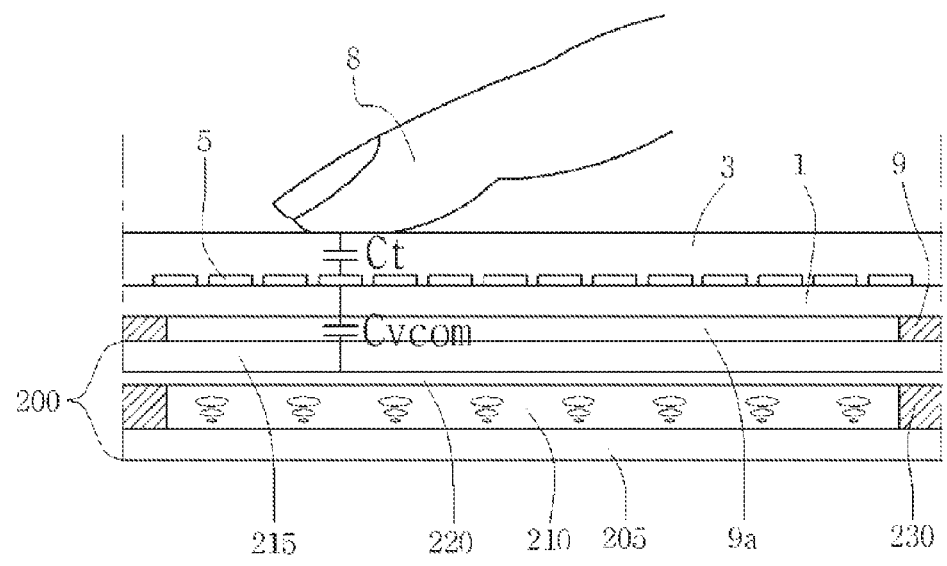
[Prior Art]

[FIG. 4]
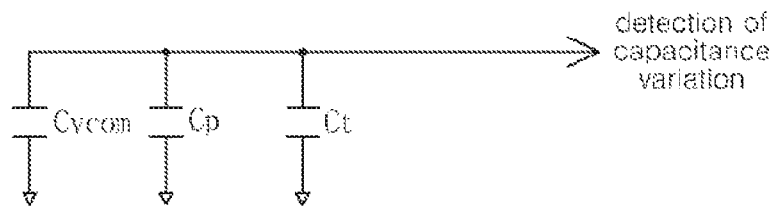
[Prior Art]
[FIG. 5]
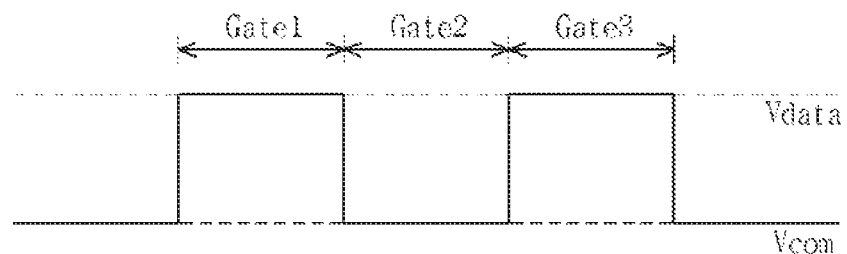
[FIG. 6]
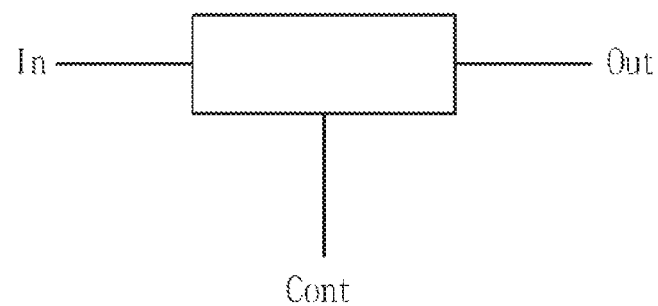

[FIG. 7]
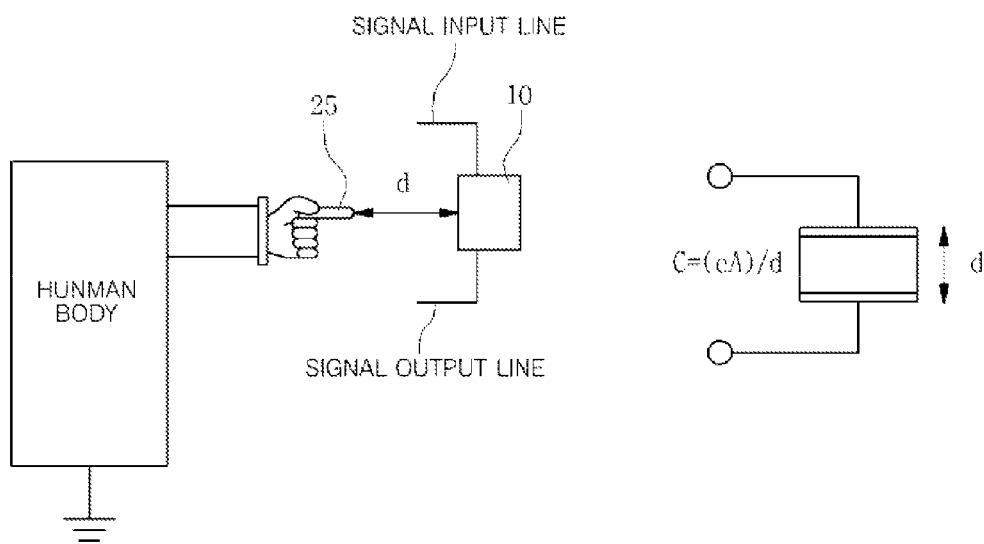

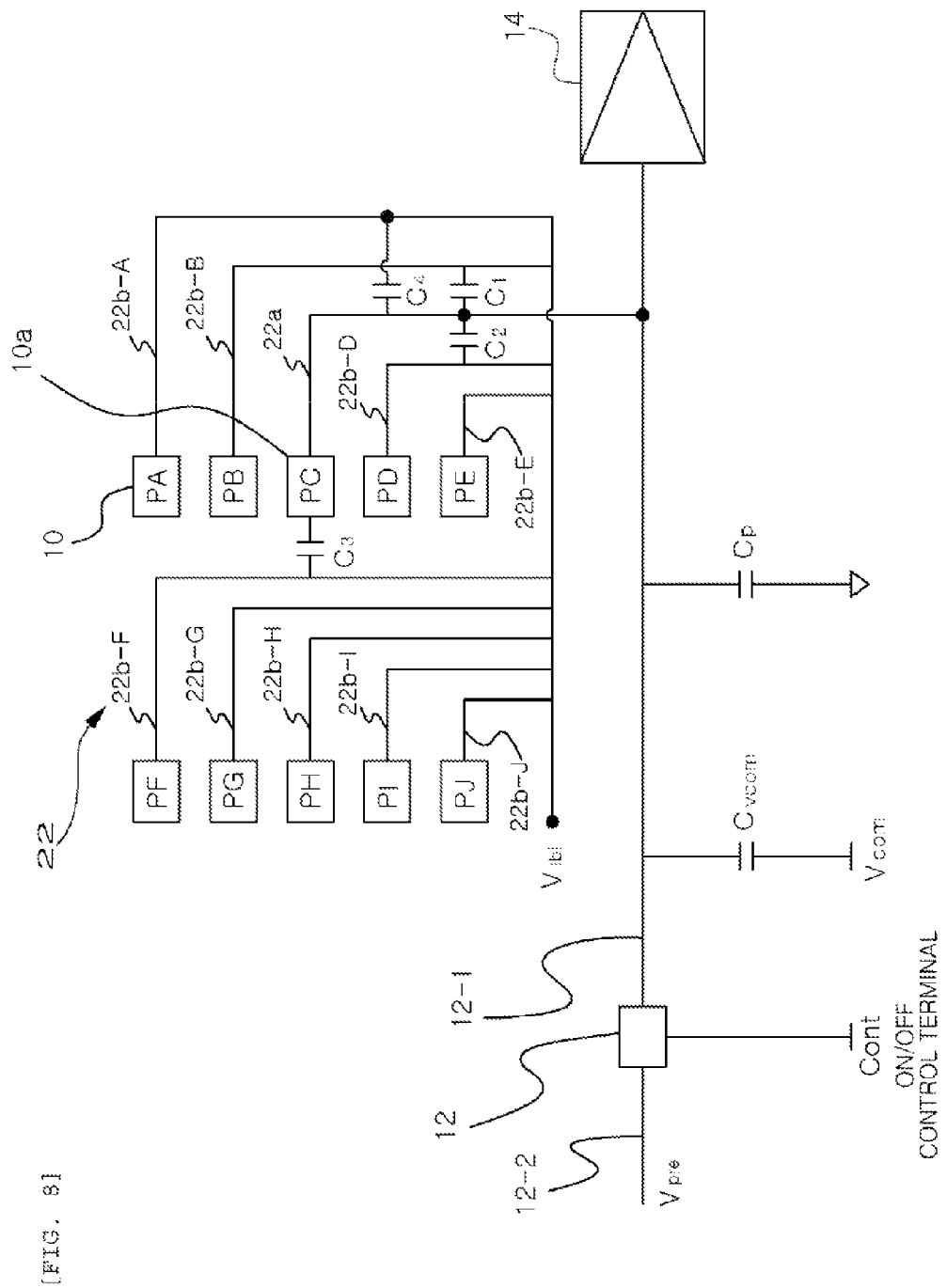
[FIG. 8]

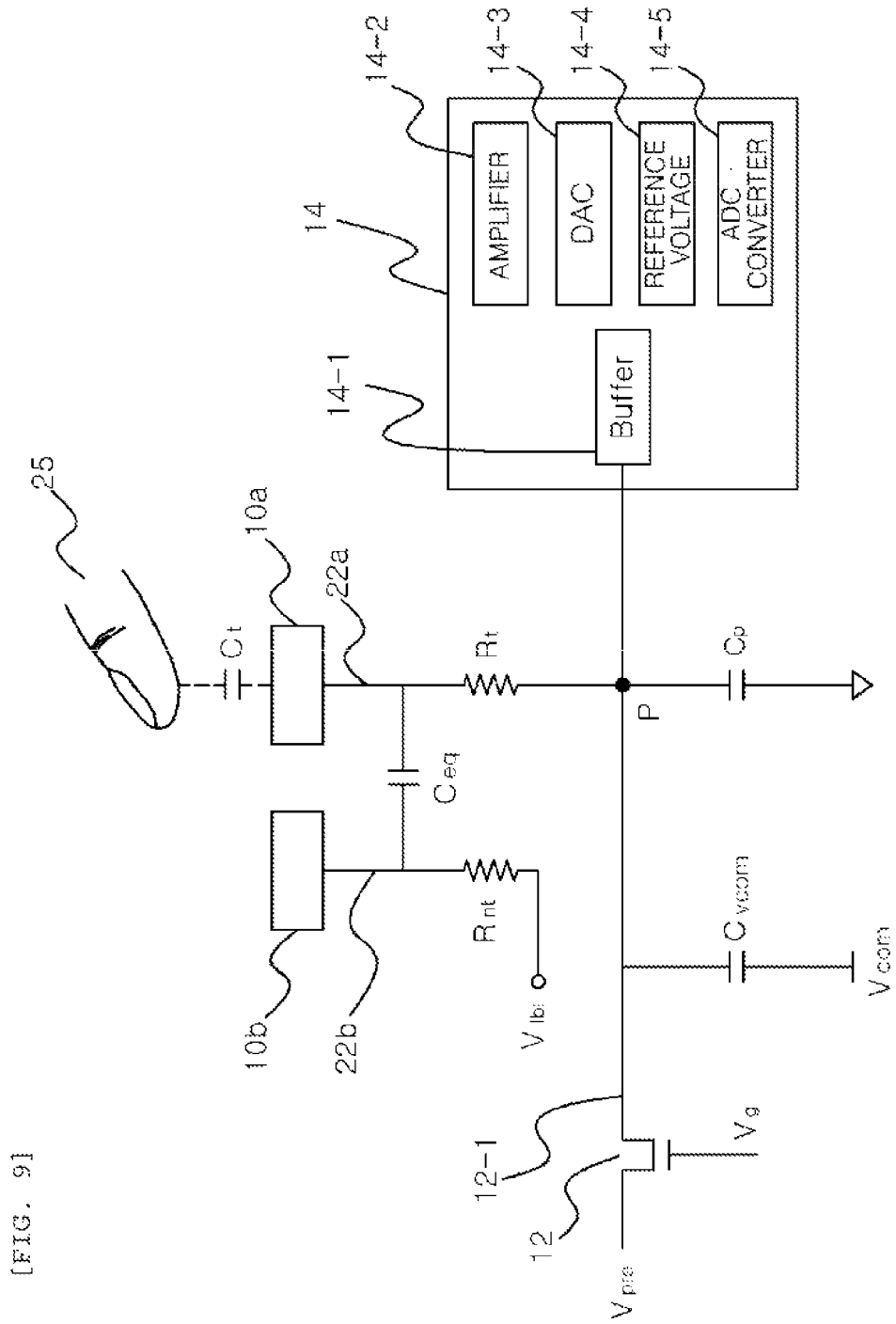

[FIG. 10]
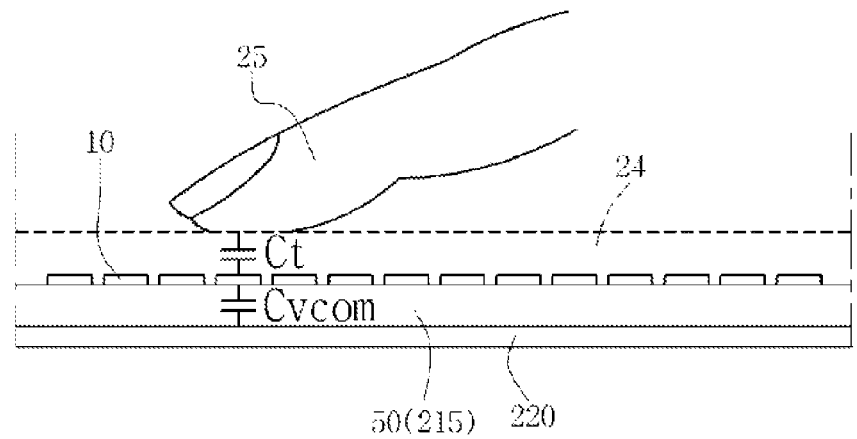
[FIG. 11]
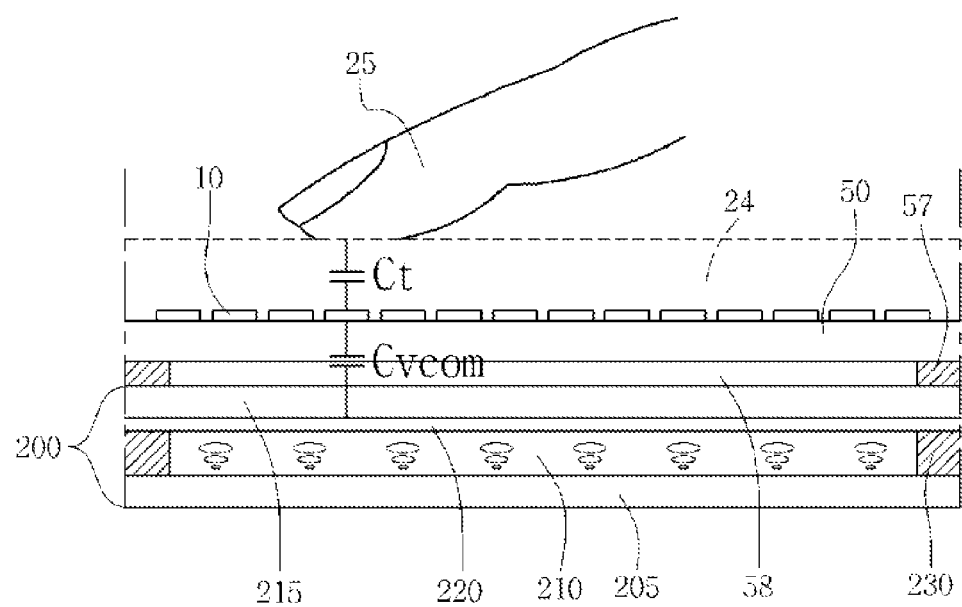

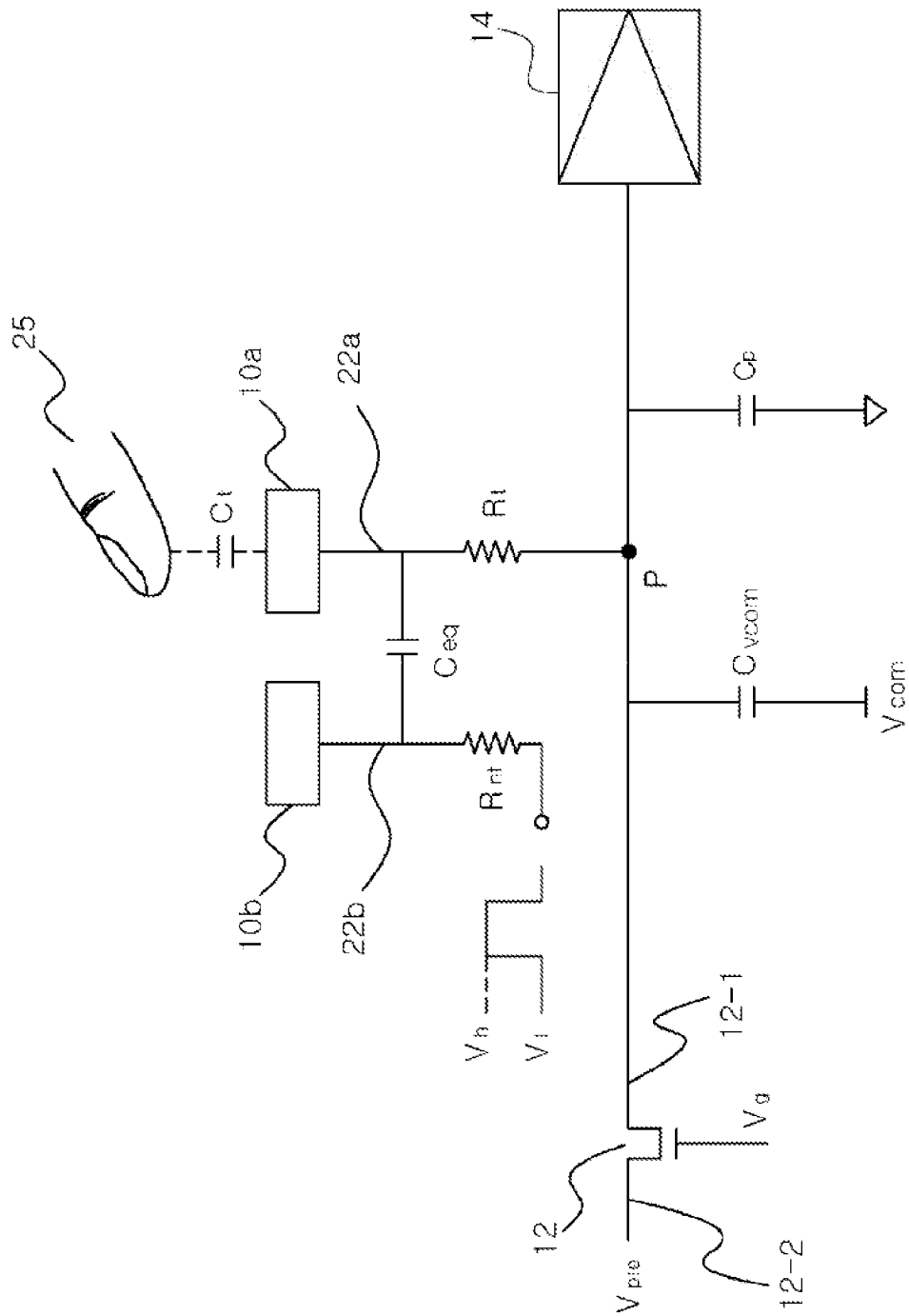
[FIG. 12]

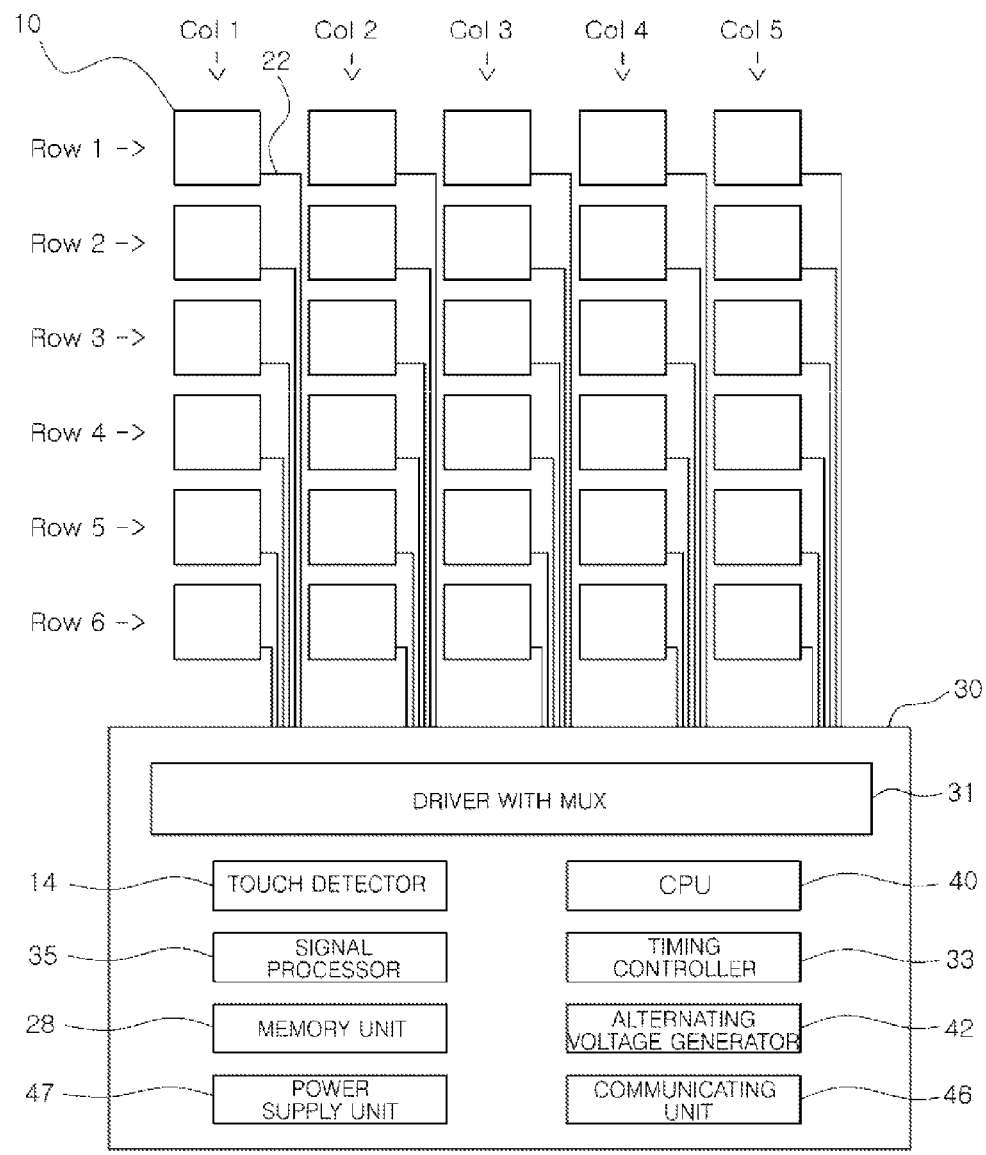
[FIG. 13]

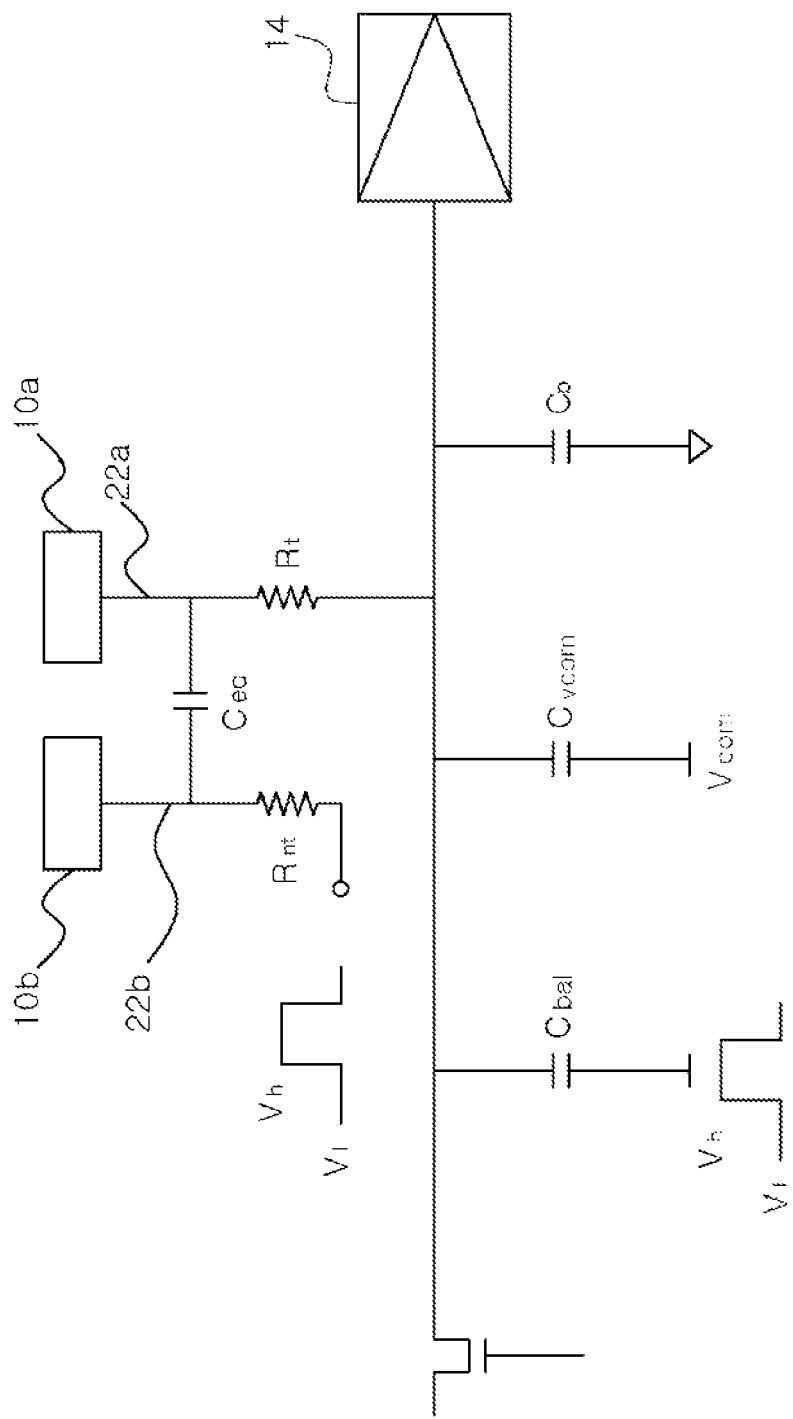
[FIG. 14]

[FIG. 15]
| address | 07h | 06h | 05h | 04h | 03h | 02h | 01h | 00h |
|---------|-----|-----|-----|-----|-----|-----|-----|-----|
| Voltage | 16V | 14V | 12V | 10V | 8V  | 6V  | 4V  | 2V  |
[FIG. 16]
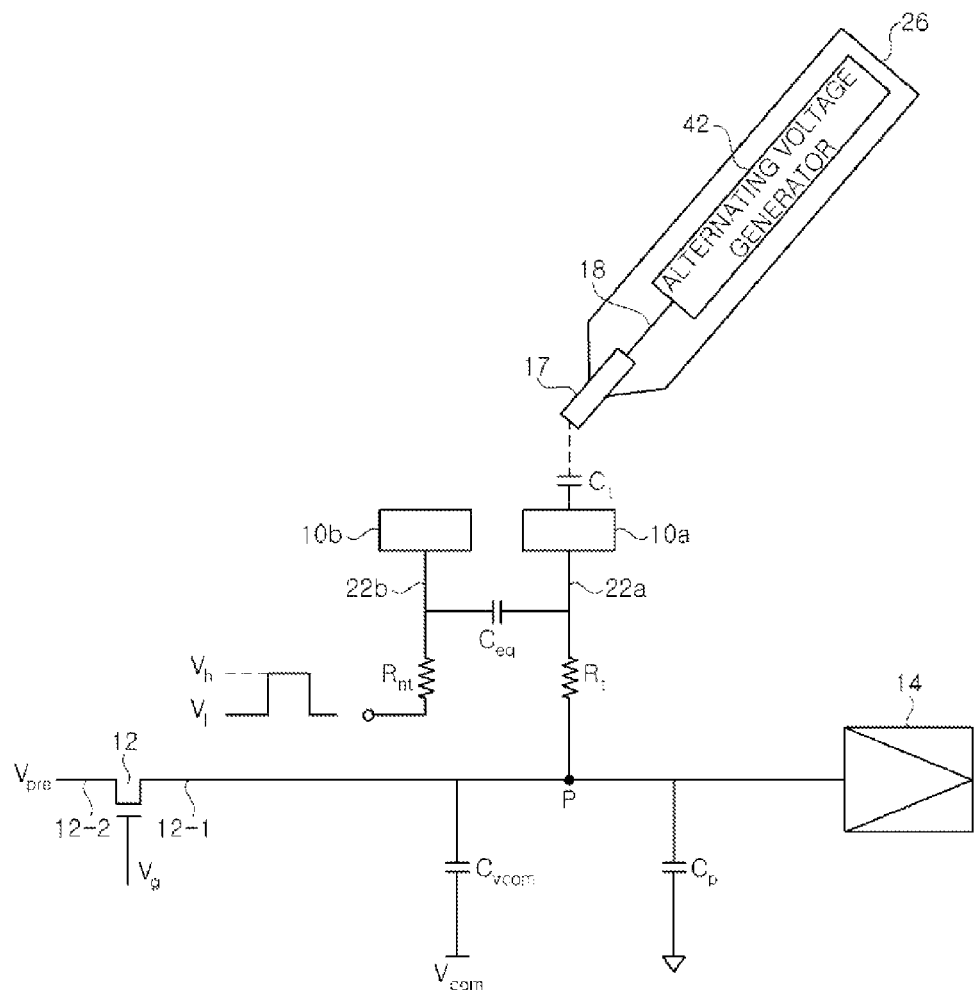

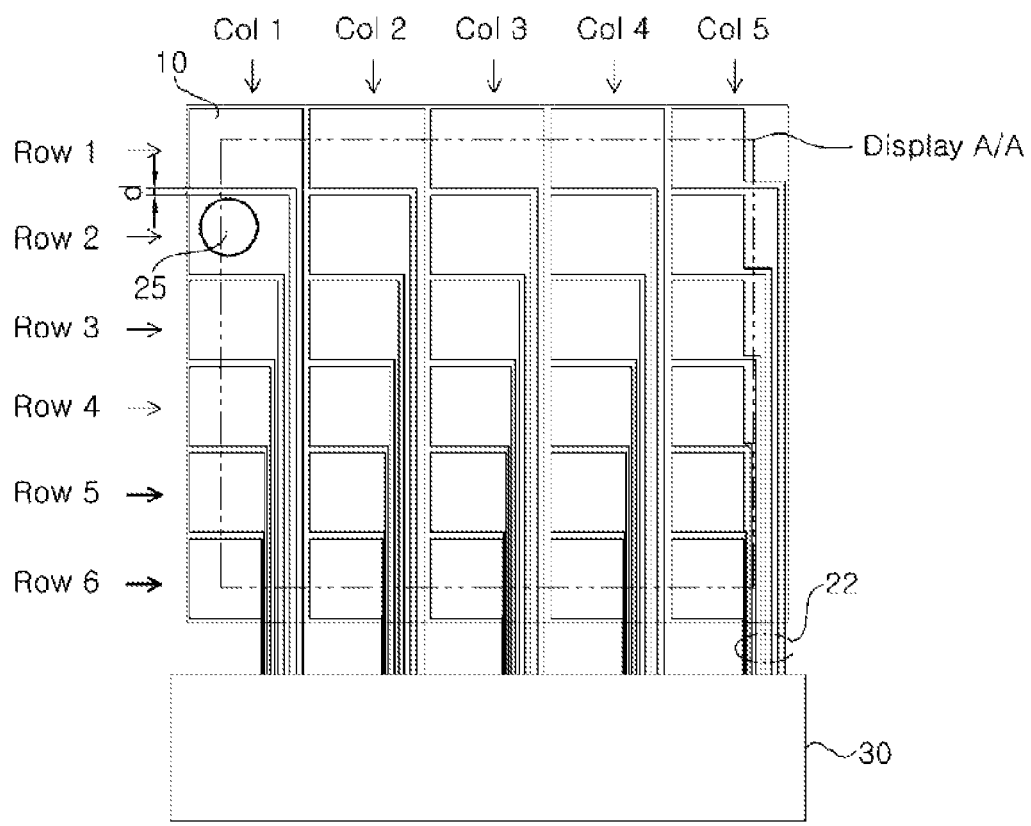

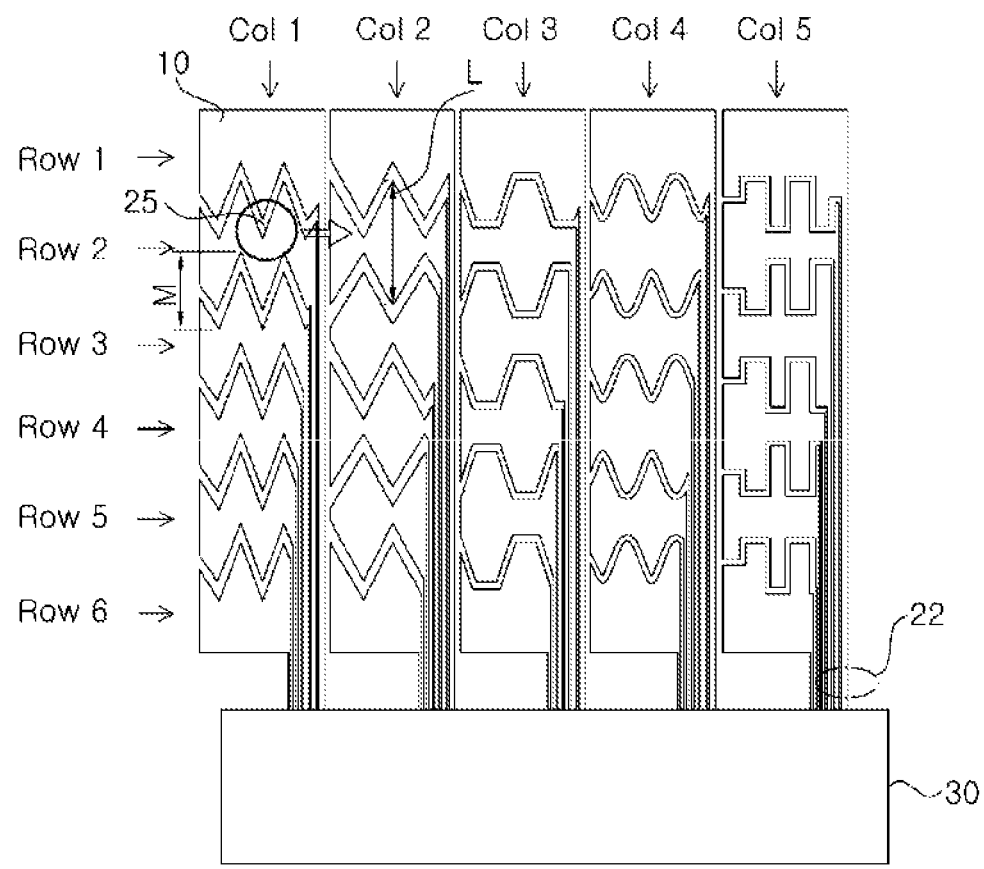
[FIG. 18]

[FIG. 19A]
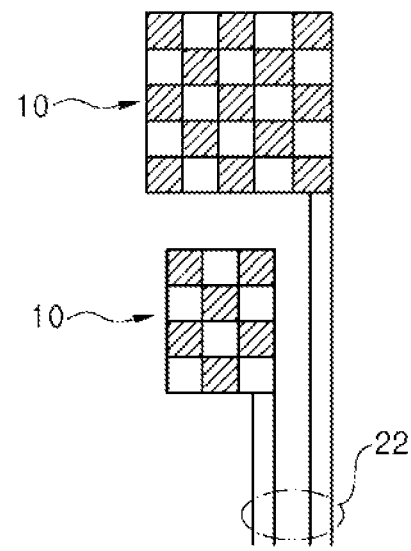
[FIG. 19B]
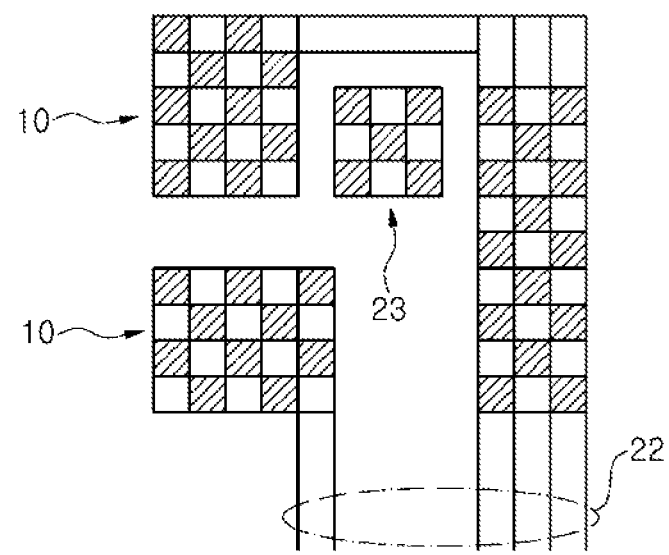

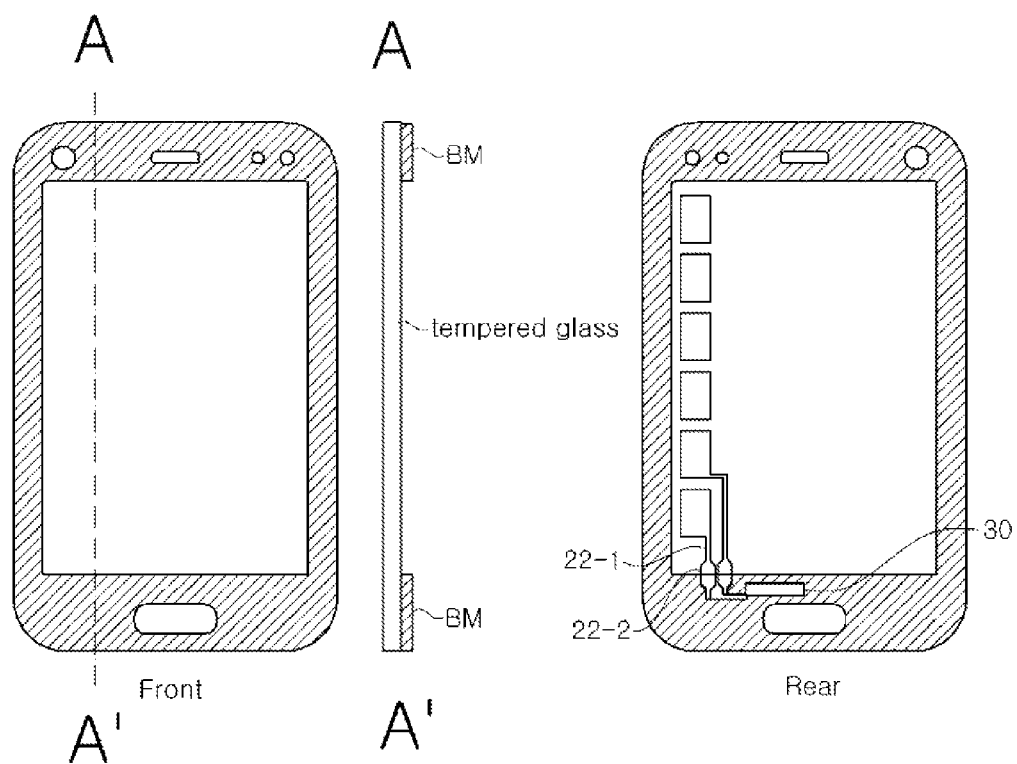
[FIG. 20]

ns and more as sensing the sign and acquire a touch signal.

CAPACITIVE TYPE TOUCH DETECTION MEANS AND DETECTION METHOD

CROSS-REFERENCE TO RELATED APPLICATIONS

This application claims priority from and the benefit of Korean Patent Application No. 10-2013-0038160, filed on Apr. 8, 2013, which is hereby incorporated by reference for all purposes as if fully set forth herein.

BACKGROUND OF THE INVENTION

Field of the Invention

The present invention relates to a means and a method for detecting a capacitive type touch input of a touch input means like a finger of a human body or a touch input means having a conductive property similar thereto, and more particularly, to a capacitive type touch detection means and a detection method for applying an alternating driving voltage to one side of a sensing equivalent capacitor formed between a sensing pad and a non-sensing pad and detecting a difference in voltage generated from a touch detector depending on a touch to acquire a touch signal.

Discussion of the Background

Generally, a touch screen panel is attached on display devices such as a liquid crystal display (LCD), a plasma display panel (PDP), and an organic light emitting diode (OLED), an active matrix organic light emitting diode (AMOLED) and is one of the input devices which generate signals corresponding to positions where objects such as a finger and a pen are touched. The touch screen panel has been used in wide applications such as small portable terminals, industrial terminals, digital information devices (DID), etc.

Typically, various types of touch screen panels have been disclosed. However, a resistive type touch screen panel having simple manufacturing process and low manufacturing costs has been most widely used. However, since the resistive type touch screen panel has low transmittivity and is applied with a considerable pressure, the resistive type touch screen panel is inconvenient to use, has a difficulty in implementing a multi touch and a gesture cognition, leads to a detection error, etc.

On the other hand, a capacitive type touch screen panel may have high transmittivity, cognize a soft touch, and implement better multi touch and gesture cognition, and as a result has gradually expanded its market share.

FIG. 1 illustrates an example of the existing capacitive type touch screen panel. Referring to FIG. 1, transparent conductive layers are formed on upper and lower surfaces of a transparent substrate 2 made of plastic, glass, etc., and voltage applying metal electrodes 4 are formed at four corners of the transparent substrate 2, respectively. The transparent conductive layer is made of transparent metals such as indium tin oxide (ITO) and antimony tin oxide (ATO). Further, the metal electrodes 4 formed at four corners of the transparent conductive layer are formed by being printed with conductive metal having low resistivity such as silver Ag. A resistance network is formed around the metal electrodes 4. The resistance network is formed in a linearization pattern to equally send out a control signal to the whole surface of the transparent conductive layer. Further, an upper portion of the transparent conductive layer including the metal electrode 4 is coated with a passivation layer.

In the capacitive type touch screen panel as described above, a high-frequency alternating voltage is applied to the metal electrode 4 and thus is applied over the whole surface of the transparent substrate 2. In this case, when the transparent conductive layer on an upper surface of the transparent substrate 2 is lightly touched with a finger 8 or a conductive touch input means, a change in current is sensed by a current sensor embedded in a controller 6 while a predetermined amount of current is absorbed into a body and current amounts at each of the four metal electrodes 4 are calculated, thereby cognizing touched points.

However, the capacitive type touch screen panel as illustrated in FIG. 1 is based on a method for detecting a magnitude of micro current. As a result, the capacitive type touch screen panel needs an expensive detection apparatus and therefore a price of the capacitive type touch screen panel goes up as well as the capacitive type touch screen panel is hard to implement a multi touch for cognizing a plurality of touches.

To overcome the above problems, the capacitive type touch screen panel as illustrated in FIG. 2 has been mainly used in recent years. The touch screen panel of FIG. 2 is configured to include a lateral linear touch detection sensor 5a, a longitudinal linear touch detection sensor 5b, and a touch drive IC 7 analyzing a touch signal. The touch screen panel is based on a method for detecting a magnitude of capacitance formed between the linear touch detection sensor 5 and the finger 8 (FIG. 1) and scans the lateral linear touch detection sensor 5a and the longitudinal linear touch detection sensor 5b to detect a signal, thereby cognizing the plurality of touched points.

However, when the touch screen panel as described above is installed on a display device such as an LCD, the touch screen panel is hard to detect the signal due to noise. For example, the LCD uses a common electrode. In some cases, an alternating common voltage Vcom is applied to the common electrode. Further, the common voltage Vcom of the common electrode acts as noise at the time of detecting the touched point.

FIG. 3 illustrates an embodiment in which the existing capacitive type touch screen panel is installed on the LCD. A display device 200 has a structure in which a liquid crystal is sealed between a TFT substrate 205 and a color filter 215 disposed thereover to form a liquid crystal layer 210. To seal the liquid crystal, outer portions of the TFT substrate 205 and the color filter 215 are bonded to each other by a sealant 230. Although not illustrated, polarizing plates are attached to upper and lower portions of a liquid crystal panel and back light units (BLUs) are additionally installed thereto.

As illustrated, the touch screen panel is installed on the display device 200. The touch screen panel has a structure in which the linear touch detection sensor 5 is put on the substrate 1. A protection panel 3 for protecting the linear touch detection sensor 5 is attached on the substrate 1. The touch screen panel is bonded to an edge portion of the display device 200 by an adhesive member 9 such as a double adhesive tape (DAT) and forms an air-gap 9a between the adhesive member 9 and the display device 200.

In this configuration, when a touch is generated as illustrated in FIG. 3, a capacitance such as Ct is formed between the finger 8 and the linear touch detection sensor 5. However, as illustrated, a capacitance such as common electrode capacitance Cvcom is formed between the linear touch detection sensor 5 and a common electrode 220 formed on a lower surface of the color filter 215 of the display device 200 and an unknown parasitic capacitance Cp is also applied to the linear touch detection sensor 5 due to a capacitance coupling between patterns, manufacturing process factors, etc. Therefore, a circuit like an equivalent circuit of FIG. 4 is configured.

Here, the existing touch screen panel detects a variation of Ct which is a touch capacitance to cognize a touch and components such as Cvcom and Cp act as noise in detecting the Ct. In particular, the Cp by the capacitance coupling between the patterns is ten times as large as the Ct which is the touch capacitance, and therefore touch sensitivity may be degraded due to the Cp.

SUMMARY OF THE INVENTION

An object of the present invention is to provide a capacitive type touch detection means and a detection method capable of minimizing an effect of parasitic capacitance and stably acquiring a touch signal, by applying an alternating driving voltage to one side of a sensing equivalent capacitor which is formed between a sensing pad connected to a touch detector and a non-sensing pad adjacent to the sensing pad and typically acts as a parasitic capacitor and acquiring a touch signal using the phenomenon that a difference in a magnitude of voltage detected by the touch detector occurs in response to a magnitude in touch capacitance, when the touch capacitance is formed between a touch input means such as a finger and the sensing pad.

As described above, a characteristic configuration of present invention is as follows for achieving the above objects of the present invention and specific effects of the present invention.

According to an exemplary embodiment of the present invention, there is provided a touch detection means including: a plurality of touch detection sensors; a plurality of sensor signal lines configured to apply a signal to the touch detection sensor or receive a signal acquired from the touch detection sensor; and a touch detector 14 configured to detect whether a touch is generated by a touch input means based on the acquired signal, wherein the touch detection sensor is classified into at least one sensing pad and at least one non-sensing pad and the generation of the touch is detected based on a change in voltage in a plurality of equivalent capacitors Ceq which are formed between at least one sensing pad sensor signal line connected to the sensing pad and at least one non-sensing pad sensor signal line connected to the non-sensing pad.

The generation of the touch may be detected in a state in which an alternating voltage is applied to the equivalent capacitor and the alternating voltage is applied through the non-sensing pad sensor signal line.

The touch detection means may further include: a three-terminal switching device configured to be a charging means for charging the touch detection sensor prior to detecting whether the touch is generated, wherein the three-terminal switching device supplies a charging signal input to an input terminal by a control signal supplied to a control terminal to the touch detection sensor connected to an output terminal to charge the touch detection sensor.

The input terminal may keep a high impedance state which is equal to or more than 100 Kohm and the output terminal may keep a high impedance state which is equal to or more than 100 Kohm when the touch detector detects whether the touch is generated.

A charging time may be determined by adjusting a turn on time of the control signal of the three-terminal switching device.

The equivalent capacitor may be classified into at least one of a first capacitance between lines and a second capacitance between lines depending on a magnitude of a capacitance of the equivalent capacitor.

The touch detection means may further include: prior to detecting whether the touch is generated, a charging means configured to charge the first capacitance between lines and the second capacitance between lines with a precharge signal having the same voltage.

The second capacitance between lines may be larger than the first capacitance between lines.

The second capacitance between lines and the first capacitance between lines may vary by adjusting a distance between the sensing pad sensor signal line and the non-sensing pad sensor signal line.

The touch may be detected by using only any one of the first capacitance between lines and the second capacitance between lines at the time of detecting whether the touch is generated.

When the generation of the touch is detected using the first capacitance between lines, the non-sensing pad sensor signal line participating in the formation of the second capacitance between lines may keep a floating state or the high impedance state.

The touch detection sensor, the sensing pad sensor signal line, and the non-sensing pad sensor signal line may be formed using the same mask.

A width of the sensor signal line may be differently formed depending on a position of the touch detection sensor.

An alternating voltage may be applied to the equivalent capacitor after the touch detection sensor is charged.

The touch detection means may further include: a means configured to change the magnitude in alternating voltage.

The touch detection means may further include: a means configured to change a gradient of a rising edge or a falling edge of the alternating voltage.

The touch detection means may further include: a touch capacitor Ct configured to be formed by the touch detection sensor and the touch of the touch input means; and a common electrode capacitor Cvcom configured to be formed between the touch detection sensor and the common electrode applying the common voltage to a display device including the touch detection sensor.

When the touch is not sensed by the touch detection sensor, the voltage sensed by the touch detector may be calculated by the following Equation 1.

The following Equation 1 may be $$Vsensor_{nontouch} = Vpre + (Vh - Vl)\frac{Ceq}{Ceq + Cvcom + Cp}.$$

In the above Equation 1, $Vsensor_{nontouch}$ may represent the voltage detected by the touch detector 14 when the touch is not made, $V_{pre}$ may represent a charging voltage of the touch detection sensor, $V_h$ may represent a high level voltage of the alternating voltage applied to the non-sensing pad sensor signal line, $V_l$ may represent a low level voltage of the alternating voltage applied to the non-sensing pad sensor signal line, Cvcom may represent the capacitance of the common electrode capacitor, Cp may represent a parasitic capacitance generated by the touch detection means, Ct may represent the capacitance of the touch capacitor, a polarity of $V_h$-$V_l$ may be positive when the alternating voltage alternates from low to high, and the polarity of $V_h$-$V_l$ may be negative when the alternating voltage alternates from high to low.

When the touch is sensed by the touch detection sensor, the voltage sensed by the touch detector may be calculated by the following Equation 2.

The following Equation 2 may be $$Vsensor_{touch} = Vpre + (Vh - Vl)\frac{Ceq}{Ceq + Cvcom + Cp + Ct}.$$

In the above Equation 2, $Vsensor_{touch}$ may represent the voltage detected by the touch detector 14 when the touch is generated, $V_{pre}$ may represent a charging voltage of the touch detection sensor, $V_h$ may represent a high level voltage of the alternating voltage applied to the non-sensing pad sensor signal line, $V_l$ may represent a low level voltage of the alternating voltage applied to the non-sensing pad sensor signal line, Cvcom may represent the capacitance of the common electrode capacitor, Cp may represent a parasitic capacitance generated by the touch detection means, Ct may represent the capacitance of the touch capacitor, a polarity of $V_h$-$V_l$ may be positive when the alternating voltage alternates from low to high, and the polarity of $V_h$-$V_l$ may be negative when the alternating voltage alternates from high to low.

The determination on whether the touch is generated by the touch detector may be based on a difference between the voltage acquired by the above Equation 1 and the voltage acquired by the above Equation 2.

The above Equation 1 may be $$Vsensor_{nontouch} = Vpre + (Vh - Vl)\frac{Ceq}{Ceq + Cvcom + Cp}$$

and the above Equation 2 may be $$Vsensor_{touch} = Vpre + (Vh - Vl)\frac{Ceq}{Ceq + Cvcom + Cp + Ct}.$$

In the above Equations 1 and 2, $Vsensor_{nontouch}$ may represent the voltage detected by the touch detector 14 when the touch is not made, $Vsensor_{touch}$ may represent the voltage detected by the touch detector 14 when the touch is generated, $V_{pre}$ may represent a charging voltage of the touch detection sensor, $V_h$ may represent a high level voltage of the alternating voltage applied to the non-sensing pad sensor signal line, $V_l$ may represent a low level voltage of the alternating voltage applied to the non-sensing pad sensor signal line, Cvcom may represent the capacitance of the common electrode capacitor, Cp may represent a parasitic capacitance generated by the touch detection means, Ct may represent the capacitance of the touch capacitor, a polarity of $V_h$-$V_l$ may be positive when the alternating voltage alternates from low to high, and the polarity of $V_h$-$V_l$ may be negative when the alternating voltage alternates from high to low.

The touch detection sensors may be arranged in an array and the touch detector may detect signals in each row.

The touch detection means may further include: a compensation capacitor configured to compensate for a difference between the first capacitance between lines and the second capacitance between lines.

One side of the compensation capacitor may be connected to the touch detector and may receive the same alternating voltage as the alternating voltage through the other side of the compensation capacitor.

One side of the compensation capacitor may be connected to the touch detector and may receive the alternating voltage different from the alternating voltage through the other side of the compensation capacitor.

When the touch is not sensed by the touch detection sensor, the voltage sensed by the touch detector may be calculated by the following Equation 5.

The following Equation 5 may be $$Vsensor_{nontouch} = Vpre + (Vh - Vl)\frac{Ceq + Cval}{Ceq + Cabl + Cvcom + Cp}.$$

In the above Equation 5, $Vsensor_{nontouch}$ may represent the voltage detected by the touch detector 14 when the touch is not made, $V_{pre}$ may represent a charging voltage of the touch detection sensor, $V_h$ may represent a high level voltage of the alternating voltage applied to the non-sensing pad sensor signal line and the compensation capacitor, $V_l$ may represent a low level voltage of the alternating voltage applied to the non-sensing pad sensor signal line and the compensation capacitor Cba1, Cvcom may represent the capacitance of the common electrode capacitor formed between the touch detection sensor and the common electrode applying the common voltage to the display device including the touch detection sensor, Cp may represent a parasitic capacitance generated by the touch detection means, Ct may represent the capacitance of the touch capacitor formed by the touch detection sensor and the touch of the touch input means, a polarity of $V_h$-$V_l$ may be positive when the alternating voltage alternates from low to high, and the polarity of $V_h$-$V_l$ may be negative when the alternating voltage alternates from high to low.

When the touch is sensed by the touch detection sensor, the voltage sensed by the touch detector may be calculated by the following Equation 6.

The following Equation 6 may be $$Vsensor_{touch} = Vpre + (Vh - Vl)\frac{Ceq + Cbal}{Ceq + Cbal + CvcomCp + Ct}.$$

In the above Equation 6, $Vsensor_{touch}$ may represent the voltage detected by the touch detector 14 when the touch is generated, $V_{pre}$ may represent a charging voltage of the touch detection sensor, $V_h$ may represent a high level voltage of the alternating voltage applied to the non-sensing pad sensor signal line and the compensation capacitor, $V_l$ may represent a low level voltage of the alternating voltage applied to the non-sensing pad sensor signal line and the compensation capacitor Cba1, Cvcom may represent the capacitance of the common electrode capacitor formed between the touch detection sensor and the common electrode applying the common voltage to the display device including the touch detection sensor, Cp may represent a parasitic capacitance generated by the touch detection means, Ct may represent the capacitance of the touch capacitor formed by the touch detection sensor and the touch of the touch input means, a polarity of $V_h$-$V_l$ may be positive when the alternating voltage alternates from low to high, and the polarity of $V_h$-$V_l$ may be negative when the alternating voltage alternates from high to low.

The determination on whether the touch is generated by the touch detector may be based on a difference between the voltage acquired by the above Equation 5 and the voltage acquired by the above Equation 6.

The above Equation 5 may be $$Vsensor_{nontouch} = Vpre + (Vh + Vl)\frac{Ceq + Cbal}{Ceq + Cabl + Cvcom + Cp}$$

and the following Equation 6 may be $$Vsensor_{touch} = Vpre + (Vh - Vl)\frac{Ceq + Cbal}{Ceq + Cbal + Cvcom + Cp + Ct}.$$

In the above Equations 5 and 6, $Vsensor_{nontouch}$ may represent the voltage detected by the touch detector 14 when the touch is not made, $Vsensor_{touch}$ may represent the voltage detected by the touch detector 14 when the touch is generated, $V_{pre}$ may represent a charging voltage of the touch detection sensor, $V_h$ may represent a high level voltage of the alternating voltage applied to the non-sensing pad sensor signal line and the compensation capacitor, $V_l$ may represent a low level voltage of the alternating voltage applied to the non-sensing pad sensor signal line and the compensation capacitor Cba1, Cvcom may represent the capacitance of the common electrode capacitor formed between the touch detection sensor and the common electrode applying the common voltage to the display device including the touch detection sensor, Cp may represent a parasitic capacitance generated by the touch detection means, Ct may represent the capacitance of the touch capacitor formed by the touch detection sensor and the touch of the touch input means, a polarity of $V_h$-$V_l$ may be positive when the alternating voltage alternates from low to high, and the polarity of $V_h$-$V_l$ may be negative when the alternating voltage alternates from high to low.

The touch detector may detect whether the touch is generated in synchronization with a rising edge of the alternating voltage or a falling edge of the alternating voltage.

The touch detector may detect whether the touch is generated at a predetermined time interval from the rising edge of the alternating voltage or the falling edge of the alternating voltage.

An alternating voltage generator generating the alternating voltage may have a pen shape and the generated alternating voltage may be transferred through a lead of the pen.

Bonded parts between the touch detection sensors may face each other, having a geometrical shape having at least one inflection point or flexural part.

The touch detection sensor may be partitioned into a plurality of areas, only a part of the partitioned areas may be provided with predetermined patterns, and the formed patterns may be connected to each other.

A width of the sensor signal line may be formed to be wide when the sensor signal line passes through a BM part of a display device.

According to another exemplary embodiment of the present invention, there is provided a touch detection method including: charging a plurality of touch detection sensors with a predetermined charging voltage using a three-terminal switching device; classifying the plurality of touch detection sensors into at least one sensor pad and at least one non-sensing pad; forming a plurality of equivalent capacitors Ceq between at least one sensing pad sensor signal line connected to the sensing pad and at least one non-sensing pad sensor signal line connected to the non-sensing pad; and applying an alternating voltage to the equivalent capacitor through the non-sensing pad sensor signal line by a touch detector and detecting a touch based on a change in voltage generated in the equivalent capacitor according to whether the touch is generated by the touch input means.

The classification of the sensing pad and the non-sensing pad may be sequentially determined based on a defined order.

The touch detector may detect whether the touch is generated in synchronization with a rising edge of the alternating voltage or a falling edge of the alternating voltage.

The touch detector may detect whether the touch is generated at a predetermined time interval from the rising edge of the alternating voltage or the falling edge of the alternating voltage.

The three-terminal switching device may supply a charging signal input to an input terminal by a control signal supplied to a control terminal to the touch detection sensor connected to an output terminal to charge the touch detection sensor.

The input terminal may keep a high impedance state which is equal to or more than 100 Kohm and the output terminal may keep a high impedance state which is equal to or more than 100 Kohm when the touch detector detects whether the touch is generated.

A charging time may be determined by adjusting a turn on time of the control signal of the three-terminal switching device.

The equivalent capacitor may be classified into at least one of a first capacitance between lines and a second capacitance between lines depending on a magnitude of a capacitance of the equivalent capacitor.

The touch detection method may further include: prior to detecting whether the touch is generated, charging the first capacitance between lines and the second capacitance between lines with a precharge signal having the same voltage.

The second capacitance between lines may be larger than the first capacitance between lines.

The second capacitance between lines and the first capacitance between lines may vary by adjusting a distance between the sensing pad sensor signal line and the non-sensing pad sensor signal line.

The generation of the touch may be detected by using only any one of the first capacitance between lines and the second capacitance between lines at the time of detecting whether the touch is generated.

When the generation of the touch is detected using the first capacitance between lines, the non-sensing pad sensor signal line participating in the formation of the second capacitance between lines may keep a floating state or the high impedance state.

The touch detection sensor, the sensing pad sensor signal line, and the non-sensing pad sensor signal line may be formed using the same mask.

A width of the sensor signal line may be differently formed depending on a position of the touch detection sensor.

The touch detection method may further include: changing the magnitude in alternating voltage.

The touch detection method may further include: changing a gradient of a rising edge or a falling edge of the alternating voltage.

When the touch is not sensed by the touch detection sensor, the voltage sensed by the touch detector may be calculated by the following Equation 1.

The following Equation 1 may be $$Vsensor_{nontouch} = Vpre + (Vh - Vl)\frac{Ceq}{Ceq + Cvcom + Cp}.$$

In the above Equation 1, Vsensor$_{nontouch}$ may represent the voltage detected by the touch detector when the touch is not made, V$_{pre}$ may represent a charging voltage of the touch detection sensor, V$_h$ may represent a high level voltage of the alternating voltage applied to the non-sensing pad sensor signal line, V$_l$ may represent a low level voltage of the alternating voltage applied to the non-sensing pad sensor signal line, Cvcom may represent the capacitance of the common electrode capacitor formed between the touch detection sensor and the common electrode applying the common voltage to the display device including the touch detection sensor, Cp may represent a parasitic capacitance generated by the touch detection means, Ct may represent the capacitance formed by the touch detection sensor and the touch of the touch input means, a polarity of V$_h$-V$_l$ may be positive when the alternating voltage alternates from low to high, and the polarity of V$_h$-V$_l$ may be negative when the alternating voltage alternates from high to low.

When the touch is sensed by the touch detection sensor, the voltage sensed by the touch detector may be calculated by the following Equation 2.

The following Equation 2 may be $$Vsensor_{touch} = Vpre + (Vh - Vl)\frac{Ceq}{Ceq + Cvcom + Cp + Ct}.$$

In the above Equation 2, Vsensor$_{touch}$ may represent the voltage detected by the touch detector 14 when the touch is generated, V$_{pre}$ may represent a charging voltage of the touch detection sensor, V$_h$ may represent a high level voltage of the alternating voltage applied to the non-sensing pad sensor signal line, V$_l$ may represent a low level voltage of the alternating voltage applied to the non-sensing pad sensor signal line, Cvcom may represent the capacitance of the common electrode capacitor formed between the touch detection sensor and the common electrode applying the common voltage to the display device including the touch detection sensor, Cp may represent a parasitic capacitance generated by the touch detection means, Ct may represent the capacitance formed by the touch detection sensor and the touch of the touch input means, a polarity of V$_h$-V$_l$ may be positive when the alternating voltage alternates from low to high, and the polarity of V$_h$-V$_l$ may be negative when the alternating voltage alternates from high to low.

The determination on whether the touch is generated by the touch detector may be based on a difference between the voltage acquired by the above Equation 1 and the voltage acquired by the above Equation 2.

The above Equation 1 may be $$Vsensor_{nontouch} = Vpre + (Vh - Vl)\frac{Ceq}{Ceq + Cvcom + Cp}$$

and the above Equation 2 may be $$Vsensor_{touch} = Vpre + (Vh - Vl)\frac{Ceq}{Ceq + Cvcom + Cp + Ct}.$$

In the above Equations 1 and 2, Vsensor$_{nontouch}$ may represent the voltage detected by the touch detector 14 when the touch is not made, Vsensor$_{touch}$ may represent the voltage detected by the touch detector 14 when the touch is generated, V$_{pre}$ may represent a charging voltage of the touch detection sensor, V$_h$ may represent a high level voltage of the alternating voltage applied to the non-sensing pad sensor signal line, V$_l$ may represent a low level voltage of the alternating voltage applied to the non-sensing pad sensor signal line, Cvcom may represent the capacitance of the common electrode capacitor formed between the touch detection sensor and the common electrode applying the common voltage to the display device including the touch detection sensor, Cp may represent a parasitic capacitance generated by the touch detection means, Ct may represent the capacitance formed by the touch detection sensor and the touch of the touch input means, a polarity of V$_h$-V$_l$ may be positive when the alternating voltage alternates from low to high, and the polarity of V$_h$-V$_l$ may be negative when the alternating voltage alternates from high to low.

The touch detection sensors may be arranged in an array and the touch detector may detect signals in each row.

The touch detection method may further include: compensating for a difference between the first capacitance between lines and the second capacitance between lines.

One side of the compensation capacitor may be connected to the touch detector and may receive the same alternating voltage as the alternating voltage through the other side of the compensation capacitor.

One side of the compensation capacitor may be connected to the touch detector and may receive the alternating voltage different from the alternating voltage through the other side of the compensation capacitor.

When the touch is not sensed by the touch detection sensor, the voltage sensed by the touch detector may be calculated by the following Equation 5.

The following Equation 5 may be $$Vsensor_{nontouch} = Vpre + (Vh - Vl)\frac{Ceq + Cbal}{Ceq + Cabl + Cvcom + Cp}.$$

In the above Equation 5, Vsensor$_{nontouch}$ may represent the voltage detected by the touch detector 14 when the touch is not made, V$_{pre}$ may represent a charging voltage of the touch detection sensor, V$_h$ may represent a high level voltage of the alternating voltage applied to the non-sensing pad sensor signal line and the compensation capacitor, V$_l$ may represent a low level voltage of the alternating voltage applied to the non-sensing pad sensor signal line and the compensation capacitor Cba1, Cvcom may represent the capacitance of the common electrode capacitor formed between the touch detection sensor and the common electrode applying the common voltage to the display device including the touch detection sensor, Cp may represent a parasitic capacitance generated by the touch detection means, Ct may represent the capacitance of the touch capacitor formed by the touch detection sensor and the touch of the touch input means, a polarity of V$_h$-V$_l$ may be positive when the alternating voltage alternates from low to high, and the polarity of $V_h$-$V_l$ may be negative when the alternating voltage alternates from high to low.

When the touch is sensed by the touch detection sensor, the voltage sensed by the touch detector may be calculated by the following Equation 6.

The following Equation 6 may be $$Vsensor_{touch} = Vpre + (Vh - Vl)\frac{Ceq + Cbal}{Ceq + Cbal + Cvcom + Cp + Ct}.$$

In the above Equation 6, $Vsensor_{touch}$ may represent the voltage detected by the touch detector 14 when the touch is generated, $V_{pre}$ may represent a charging voltage of the touch detection sensor, $V_h$ may represent a high level voltage of the alternating voltage applied to the non-sensing pad sensor signal line and the compensation capacitor, $V_l$ may represent a low level voltage of the alternating voltage applied to the non-sensing pad sensor signal line and the compensation capacitor Cba1, Cvcom may represent the capacitance of the common electrode capacitor formed between the touch detection sensor and the common electrode applying the common voltage to the display device including the touch detection sensor, Cp may represent a parasitic capacitance generated by the touch detection means, Ct may represent the capacitance of the touch capacitor formed by the touch detection sensor and the touch of the touch input means, a polarity of $V_h$-$V_l$ may be positive when the alternating voltage alternates from low to high, and the polarity of $V_h$-$V_l$ may be negative when the alternating voltage alternates from high to low.

The determination on whether the touch is generated by the touch detector may be based on a difference between the voltage acquired by the above Equation 5 and the voltage acquired by the above Equation 6.

The above Equation 5 may be $$Vsensor_{nontouch} = Vpre + (Vh - Vl)\frac{Ceq + Cbal}{Ceq + Cabl + Cvcom + Cp}$$

and the above Equation 6 may be $$Vsensor_{touch} = Vpre + (Vh - Vl)\frac{Ceq + Cbal}{Ceq + Cbal + Cvcom + Cp + Ct}.$$

In the above Equations 5 and 6, $Vsensor_{nontouch}$ may represent the voltage detected by the touch detector 14 when the touch is not made, $Vsensor_{touch}$, may represent the voltage detected by the touch detector 14 when the touch is generated, $V_{pre}$ may represent a charging voltage of the touch detection sensor, $V_h$ may represent a high level voltage of the alternating voltage applied to the non-sensing pad sensor signal line and the compensation capacitor, $V_l$ may represent a low level voltage of the alternating voltage applied to the non-sensing pad sensor signal line and the compensation capacitor Cba1, Cvcom may represent the capacitance of the common electrode capacitor formed between the touch detection sensor and the common electrode applying the common voltage to the display device including the touch detection sensor, Cp may represent a parasitic capacitance generated by the touch detection means, Ct may represent the capacitance of the touch capacitor formed by the touch detection sensor and the touch of the touch input means, a polarity of $V_h$-$V_l$ may be positive when the alternating voltage alternates from low to high, and the polarity of $V_h$-$V_l$ may be negative when the alternating voltage alternates from high to low.

An alternating voltage generator generating the alternating voltage may have a pen shape and the generated alternating voltage may be transferred through a lead of the pen.

Bonded parts between the touch detection sensors may face each other, having a geometrical shape having at least one inflection point or flexural part.

The touch detection sensor may be partitioned into a plurality of areas, only a part of the partitioned areas may be provided with predetermined patterns, and the formed patterns may be connected to each other.

A width of the sensor signal line may be formed to be wide when the sensing pad sensor signal line and the non-sensing pad sensor signal line pass through a BM part of a display device.

BRIEF DESCRIPTION OF THE DRAWINGS

FIG. 1 is a perspective view illustrating an example of the existing touch screen panel.

FIG. 2 is a plan configuration diagram illustrating another example of the existing touch screen panel.

FIG. 3 is a cross-sectional view illustrating an example in which the touch screen panel of the FIG. 2 is installed on a display device.

FIG. 4 is an equivalent circuit diagram detecting a touch capacitance in FIG. 3.

FIG. 5 is a waveform diagram illustrating a common voltage waveform of a liquid crystal device.

FIG. 6 is a diagram conceptually illustrating a typical three-terminal switching device.

FIG. 7 is a diagram illustrating a principle of detecting a touch input.

FIG. 8 is a circuit diagram illustrating a basic structure of a touch detection means according to an embodiment of the present invention.

FIG. 9 is an equivalent circuit diagram of FIG. 8.

FIG. 10 is a cross-sectional view illustrating an example of a configuration of a touch detection sensor.

FIG. 11 is a cross-sectional view illustrating another example of a configuration of a touch detection sensor.

FIG. 12 is an embodiment of applying an alternating voltage to a sensing equivalent capacitor.

FIG. 13 is a configuration diagram illustrating a touch screen panel according to an embodiment of the present invention.

FIG. 14 is a diagram illustrating an embodiment of the present invention of compensating for a sensing capacitance.

FIG. 15 is a diagram illustrating an embodiment of a means of which a magnitude of alternating voltage is changed in response to a setting of a register.

FIG. 16 is a diagram illustrating an embodiment having an alternating touch means.

FIG. 17 is a diagram illustrating an embodiment of a disposition of a touch detection sensor 10 and a sensor signal line 22.

FIG. 18 is a diagram illustrating an embodiment of a form of the touch detection sensor for improving touch coordinates.

FIGS. 19A and 19B are diagrams illustrating an embodiment of the present invention for improving visibility.

FIG. 20 is an embodiment of the present invention of a design of the sensor signal line 22.

DETAILED DESCRIPTION OF THE ILLUSTRATED EMBODIMENTS

Hereinafter, exemplary embodiments of the present invention will be described in detail with reference to the accompanying drawings.

First, the present invention relates to a capacitive type touch detection means and a detection method. The existing touch detection means is based on a method for detecting a magnitude of capacitance by a touch by a finger, while the present invention is based on a method for detecting a touch using the phenomenon that a difference in detection voltage due to a difference in magnitude of added touch capacitance occurs, when an alternating driving voltage is applied to a sensing equivalent capacitor formed between a sensing pad (pad connected to a touch detector) which is detecting a touch and a non-sensing pad (pad which is not connected to the touch detector as a pad corresponding to the sensing pad) adjacent to the sensing pad. A touch detection system according to the embodiment of the present invention compares a magnitude of voltage detected when a touch is not generated and a magnitude of a voltage detected when a touch capacitance is added by the generation of the touch and detects a touch based on a difference between the magnitudes of two voltages, thereby minimizing an effect due to a parasitic capacitance, etc., and more stably acquiring a touch signal.

A display device mentioned in the present invention is any one of LCD, PDP, and OLED or includes all means which displays any type of still pictures (for example, JPG, TIF, etc.) or moving pictures (MPEG2, MPEG-4, etc.) to other users.

Among the above listed display devices, the LCD requires a common voltage Vcom to drive a liquid crystal. For example, a small and medium portable LCD uses a line inversion scheme in which a common voltage of a common electrode alternates in one line or each of the plurality of gate lines, to thereby reduce current consumption. As another example, a large LCD uses a dot inversion driving scheme in which a common voltage of a common electrode has a constant DC level. As another example, an in-plane switching mode LCD displays an image by a line inversion or a dot inversion driving scheme in which a common electrode is formed in a part of an area of an LCD TFT substrate. In the case of the in-plane switching mode LCD, a back ground is commonly formed over the whole of a color filter which is exposed to the outside through a back indium tin oxide and is grounded to a ground signal to cut off electrostatic discharge (ESD).

According to the embodiment of the present invention, in addition to the electrode to which the common voltage Vcom is applied as described above, all electrodes commonly acting within the display device are referred to as the "common electrode" and an alternating voltage or a DC voltage applied to the common electrode of the display device or a voltage alternating at a unspecific frequency is referred to as a "common voltage".

The present invention detects a non-contact touch input of a finger or a touch input means having electrical characteristics similar thereto. Here, the "non-contact touch input" means that the touch input means such as a finger performs the touch input in a state in which the touch input means is spaced apart from a touch detection sensor at a predetermined distance by a substrate present between the input means and the touch detection sensor. The touch input means may contact an outer surface of the substrate. However, even in this case, the touch input means and the touch detection sensor keep a non-contact state. Therefore, a touch behavior of a finger to the touch detection sensor may be expressed by the term "access" Meanwhile, since the finger is in contact with the outer surface of the substrate, the touch behavior of the finger to the substrate may be expressed by the term "contact". In the present specification, the "access" and the "contact" are commonly used.

According to the present invention, the touch input means includes any type of inputs (for example, object like a conductor having a predetermined form or input like an electromagnetic wave, etc.) which leads to a change in voltage which may be sensed by a key board, a mouse, a finger, a touch pen, a stylus pen, and a touch detection sensor).

Further, components such as "~unit" described to be below are a set of unit function elements performing specific functions. For example, an amplifier for any signal is a unit function element and a set of amplifiers or signal converters may be named a signal conversion unit. Further, the "~unit" may be included in an upper-level component or another "~unit" or may include lower-level components and other "~units". Further, the "~unit" itself may include an operation function or the "~unit" includes an independent central processing unit (CPU) which may process commands, etc., stored in a memory, etc.

In the following drawings, to clearly represent layers and regions, a thickness or a region is exaggerated in the drawings for clarity. Like reference numerals designate like elements throughout the specification. Provided that parts such as a layer, an area, and a substrate are present "on" another part or "upper surface", this means that these parts are disposed "just on another part (there is no another part therebetween)" and these parts have another part (for example, medium layer or insulating layer) disposed therebetween.

Further, a "signal" described in the present specification is collectively referred to as a voltage or a current unless specially indicated.

Further, in the present specification, "capacitance" represents a physical magnitude and is used as the same meaning with "electrostatic capacity". Meanwhile, a "capacitor" is referred to as an element having a capacitance which represents a physical magnitude. In the present invention, a compensation capacitor Cba1 may be manufactured by a manufacturing process based on a designed value like being manufactured inside a touch drive integrated circuit (IC) and may be naturally generated like a capacitor between lines in the present specification which is manufactured between two sensor signal lines in parallel with each other at any distance. In the present specification, both a capacitor directly manufactured and a capacitor naturally formed are named "capacitor" without division.

In the present specification, sign C used as a sign of a capacitor is used as a signal representing a capacitor and represents a capacitance which is a magnitude of the capacitor. For example, C1 is a sign representing a capacitor and a capacitance which is the magnitude of the capacitor means C1.

Further, in the present specification, the meaning "forcing a signal" means that a level of a signal keeping any state is changed. For example, forcing a signal to an on/off control terminal of a switching device means that the existing low level voltage (for example, ground voltage (0 v) or DC voltage and AC voltage having a predetermined magnitude)

is changed to a high (Hi) level (for example, DC voltage or AC voltage having an amplitude value larger than the low level voltage).

Further, in the present specification, a touch detection sensor 10 (FIG. 9 or 12) includes a sensing pad 10a (FIG. 9 or 12) and a non-sensing pad 10b (FIG. 9 or 12). The sensing pad 10a is the touch detection sensor 10 connected to a touch detector 14 (FIG. 9 or 12) to detect a touch, among the plurality of touch detection sensors 10 and the non-sensing pad 10b is the touch detection sensor 10 which is not connected to the touch detector 14 without performing the touch detection. After completing the touch detection, the sensing pad 10a becomes the non-sensing pad 10b and any non-sensing pad 10b is converted into the sensing pad 10a depending on a previously defined order. Therefore, the sensing pad and the non-sensing pad are not fixed and may be converted over time and a conversion order of each sensing pad and each non-sensing pad may be sequentially determined based on a previously defined order. A time sharing technique is an embodiment defining an ordering.

Further, in the present specification, detecting the touch or detecting the touch signal has the same meaning. A representative embodiment of the touch signal detection detects a difference between a first voltage detected by the touch detector when the conductor like a finger does not contact or access the touch detection sensor 10 and thus a touch capacitance is not formed and a second voltage detected by the touch detector based on a touch capacitance Ct formed when a conductor such as a finger is opposite to the touch detection sensor.

Further, in the present specification, a TDI stands for a touch drive IC.

Further, in the present specification, a precharge and charging and a precharge voltage and a charging voltage are used as the same meaning.

Further, the sensing pad may mean including a sensor signal line connecting between the sensing pads unless specially indicated in the present specification and the non-sensing pad may mean a non-sensing pad signal line connecting between the non-sensing pads unless specially indicated in the present specification.

FIG. 6 is a diagram conceptually illustrating a three-terminal switching device used as one example of a capacitor charging means in the present invention. Referring to FIG. 6, the three-terminal switching device generally includes three terminals of an on/off control terminal Cont, an input terminal In, and an output terminal Out. The on/off control terminal Cont is a terminal controlling a turn on/turn off of the switching device. In this case, when a voltage or a current having a predetermined magnitude is applied to the on/of control terminal Cont, a voltage or a current applied to the input terminal In is output to the output terminal Out as a voltage or current form.

Prior to describing the detailed embodiment of the present invention, a principle of forming a touch capacitance and a capacitance between lines will be briefly described with reference to FIG. 7. In the example of FIG. 7, suppose that the touch detection sensor 10 and the finger 25 are spaced apart from each other at an interval of "d" and have an opposing area (or opposing contact area) called "A" when the finger 25 or the conductive touch means (for example, capacitive type touch pen) similar thereto approaches the touch detection sensor 10. Then, as illustrated in the right equivalent circuit of FIG. 7 and Equation C=(eA)/D, a capacitance "C" is formed between the finger 25 and the touch detection sensor 10. In the present specification, the capacitance formed between the finger 25 and the touch detection sensor 10 is called the touch electrostatic capacity or the touch capacitance Ct.

Further, when instead of the finger 25 and the touch detection sensor 10, two parallel signal lines are spaced apart from each other at the interval of "d" and have the opposing area called "A" in the example of FIG. 7, the capacitance between lines C illustrated in the equivalent circuit of FIG. 7 and Equation C=(eA)/D is also formed between the two signal lines. When the signal line is made of ITO or a metal material, a value obtained by multiplying a coated thickness of the material by an opposing length of the two signal lines becomes the opposing area of two parallel signal lines and a spaced degree between the two opposing signal lines becomes a spaced distance. In the present invention, an optically clear adhesive (OCA) or an air layer is formed between the two signal lines and therefore in the Equation C=(eA)/D of FIG. 7, as permittivity (e), permittivity of the OCA or the air may be applied.

FIG. 8 is a circuit diagram illustrating a basic structure of a touch detection means according to an embodiment of the present invention. Referring to FIG. 8, a specialized touch detection means according to the embodiment of the present invention has a basic structure configured of the charging means 12, the touch detection sensor 10, the sensor signal line 22, a common electrode capacitor Cvcom, a stray capacitance capacitor Cp, and the touch detector 14.

The charging means 12 is a switching device supplying $V_{pre}$, which is a precharge signal (or charging signal), to all capacitors connected to the touch detector 14 and turned off depending on a turn off signal applied to an "on/off control terminal" called "Cont" to make an output terminal 12-1 high impedance, a linear device such as an operational amplifier (AMP) supplying a signal depending on a control signal, etc.

When as the charging means 12, the three-terminal switching device is used as illustrated in an embodiment of FIG. 8, the appropriate charging voltage may be supplied to all capacitors connected to the output terminal 12-1 of the charging means 12 at a required timing by using the control signal supplied to the on/off control terminal and the signal $V_{pre}$ supplied to the input terminal 12-2. As the charging voltage, a direct current (DC) voltage including zero volt or an AC voltage alternating like a square wave, a triangular wave, or a sine wave or a voltage having a form (for example, DC voltage of a first period and AC voltage of a second period are repeated (total period=first period+second period). Here, the first period and the second period may be the same or different) in which the DC voltage and the AC voltage are combined with each other may be used.

The touch detection sensor 10 (FIG. 9 or 12) is configured to include the sensing pad 10a (FIG. 9 or 12) which is connected to the touch detector 14 (FIG. 9 or 12) to detect the touch signal and the non-sensing pad 10b (FIG. 9 or 12) which is not connected to the touch detector 14 not to detect the touch signal. The sensing pad 10a and the non-sensing pad 10b are not fixed and the same touch detection sensor 10 may be switched into time sharing (the sensing pad is switched into the non-sensing pad after a predetermined time interval). The touch detection sensor 10 which is connected to the touch detector 14 for touch detection is referred to as the sensing pad 10a and the touch detection sensor 10 which is not connected (or is spaced) to the touch detector 14 is referred to as the non-sensing pad 10b.

Therefore, the touch detection sensor 10 is classified into the sensing pad or the non-sensing pad depending on whether one touch detection sensor 10 is connected to the touch detector 14.

Suppose that in the embodiment of FIG. 8, one touch detection sensor 10 is sequentially the sensing pad and the remaining touch detection sensors 10 is the non-sensing pad. The touch detection sensor 10 marked by "PC" is operated as the sensing pad 10a and all the remaining touch detection sensors 10 are operated as non-sensing pads PA, PB, PD, PE, PF, PG, PH, PI, and PJ. The touch detection sensor marked by "PB" serves as the sensing pad before the sensing pad marked by "PC" is operated and the touch detection sensor marked by "PD" may be converted from the non-sensing pad into the sensing pad after the sensing pad marked by "PC" is operated. As such, the conversion into the sensing pad and the non-sensing pad of the touch detection sensor 10 is performed by the control of the timing controller 33 of FIG. 13 to be described below. As the embodiment of the method for detecting a touch signal using one sensing pad of FIG. 8 and another embodiment of the method for detecting a touch signal, the plurality of touch detection sensors may be operated simultaneously as the sensing pad.

In FIG. 8, when the precharge voltage $V_{pre}$ is applied to the sensing pad signal line 22a and the sensing pad 10a having a sign of PC and any voltage VLb1 having a predetermined potential difference from the $V_{pre}$ is connected to the non-sensing pad which is adjacent to the sensing pad 10a and has a sign of PB, PD, and PF and the non-sensing pad signal lines 22b-B, 22b-D, and 22b-F connected to the non-sensing pad, the capacitance is formed between the sensing pad 10a and the non-sensing pad 22b based on the principle described in FIG. 7.

Describing in detail, since the $V_{pre}$ having a predetermined potential is applied to the sensing pad signal line 22a and the sensing pad 10a and the non-sensing pad signal line 22b-B connected to the VLb1 has the predetermined opposing distance and opposing area from the sensing pad signal line 22a, the capacitance between lines C1 is formed between the non-sensing pad signal line 22b-B and the sensing pad signal line 22a by the principle described in FIG. 7, the capacitance between lines C2 is formed between the sensing pad signal line 22a and the non-sensing pad signal line 22b-D by the same principle, and the capacitance between lines C3 is formed between the sensing pad (PC) 10a and the non-sensing pad signal line 22b-F opposite thereto by the same principle.

Referring to <Equation 1> or <Equation 2> to be described below, typically, the capacitance between lines acts as the parasitic capacitance Cp and thus acts as noise which reduces the touch sensitivity. However, the present invention reversely uses the capacitance between lines to detect the touch signal to reduce the Cp in Equations obtaining the voltage detected by the touch detector, to thereby improve the touch sensitivity and the present invention positions the capacitance between lines, which is the reduced Cp, at a numerator of the Equation obtaining the voltage detected by the touch detector to have a plurality of sensitivity improvement effects which improve the touch sensitivity.

Meanwhile, even the non-sensing pad signal line 22b-B is present between the sensing pad signal line 22a and the non-sensing pad signal line 22b-A like C4, the capacitance between lines may be formed. In the present specification, the case in which the capacitance between lines is formed between the sensing pad signal line 22a and the non-sensing pad signal line like C1 to C3 is defined as a primary capacitance between lines and the capacitance formed in the state in which one or a plurality of non-sensing pad signal lines are formed between the sensing pad signal line 22a and the non-sensing pad signal line like C4 is defined as a secondary capacitance between lines.

Therefore, a plurality of secondary capacitance between lines may be formed between the sensing pad 10a and the sensing pad signal line 22a. When the secondary capacitance between lines are used for the touch detection, the touch sensitivity is improved and therefore all the non-sensing pad signal lines for forming the secondary capacitance between lines is preferably connected to the VLb1 used to form the primary capacitance between lines. The non-sensing pad signal line for forming the secondary capacitance between lines may be connected to a potential different from the VLb1 but preferably commonly uses the VLb1 to simplify a circuit.

When the simplification of the circuit or the touch sensitivity is much better than expected, the non-sensing pad signal line (signal lines 22b-A or 22b-E in the embodiment of FIG. 8) generating the secondary capacitance between lines may keep a floating or high impedance state to weaken the touch sensitivity, such that the secondary capacitance between lines does not occur between the floated non-sensing pad signal line and sensing pad signal line. A touch drive IC (TDI) generates the secondary capacitance between lines and has a means for determining whether the sensing pad signal line 22a and the non-sensing pad signal line 22b adjacent thereto are connected to each other at a predetermined potential or are kept in the floating or high impedance state. The voltage VLb1 connected to the non-sensing pad signal line 22b is a DC potential or an AC voltage which includes zero (0) V.

In the present specification, the term "closed" is also applied to the non-sensing pad signal line forming the primary capacitance between lines and is also applied to the non-sensing pad signal line forming the secondary capacitance between lines, based on the sensing pad signal line.

The sensing pad 10a is commonly connected to the primary capacitance between lines C1 to C3 and the secondary capacitance between lines, and therefore all of them may be represented by one equivalent capacitor. If the equivalent capacitor is the equivalent capacitor between lines Ceq, this may be represented by the equivalent circuit as illustrated in FIGS. 8 and 9.

Meanwhile, the equivalent capacitor between lines Ceq has the following features.

1. The longer the opposing length of the opposing sensor signal lines 22a and 22b, the wider the opposing area becomes, such that the equivalent capacitance between lines Ceq is more increased. As a result, as the sensing pad 10a is at a longer distance in the TDI, the equivalent capacitance between lines Ceq is getting larger.

2. It is possible to adjust the magnitude of the equivalent capacitance between lines Ceq depending on the opposing distance of the opposing sensor signal lines 22a and 22b. The opposing distance is a width between the opposing sensor signal lines 22a and 22b, and therefore the magnitude of the equivalent capacitance between lines Ceq may be changed depending on the design.

Referring to FIG. 9, the equivalent capacitor between lines Ceq is formed between the sensing pad 10a and the non-sensing pad 10b adjacent thereto and the non-sensing pad 10b is connected to any voltage VLb1.

In FIG. 9, the non-sensing pad 10b and the non-sensing pad signal line 22b are represented by one equivalent non-sensing pad 10b and one equivalent non-sensing pad signal line 22b, instead of a plurality of non-sensing pads and a plurality of non-sensing pad signal lines forming the primary capacitance and the secondary capacitance. In FIG. 8, all the non-sensing pad signal lines 22b other than the sensing pad 10a are connected to the predetermined voltage VLb1, and therefore in FIG. 9, the voltage VLb1 is connected to the non-sensing pad signal line 22b. Therefore, although one non-sensing pad signal line 22b is connected to the VLb1 in FIG. 9, the plurality of non-sensing pad signal lines generating the primary or secondary capacitance between lines are substantially connected to the VLb1. The VLb1 is a voltage applied to one side of the non-sensing pad signal line 22b when the precharge voltage $V_{pre}$ is applied and is a voltage for forming the equivalent capacitance between lines Ceq by the precharge. An alternating voltage is applied to the non-sensing pad signal line 22b to detect the touch signal and the VLb1 includes a low voltage or a high voltage which is the alternating voltage.

The output terminal 12-1 of the charging means 12 and all the capacitors connected to the output terminal 12-1 are connected to the touch detector 14. The buffer 14-1 is one of the components configuring the touch detector 14 and the input terminal has high impedance (Hi-z) characteristics. When the output terminal 12-1 of the charging means 12 is connected to the Hi-z input terminal of the touch detector in the Hi-z state, all the capacitors Ceq, Ct, Cvcom, and Cp connected between the output terminal 12-1 of the charging means and the buffer 14-1 are also in the Hi-z state.

Although described below, the magnitude of the Ceq is different depending on the length of the sensing pad signal line 22a connecting the sensing pad 10a, and therefore the charging time is also different depending on the position of the sensing pad. When the charging time is determined based on one fixed time, the charging time cannot but be determined as the longest time, which leads to the problem in that the touch detection time may be slow. Therefore, the TDI has a means to determine the charging time. The charging time is determined as the turn-on time of the charging means 12.

FIG. 9 illustrates that the output terminal 12-1 of the charging means 12 is directly connected to the buffer 14-1, but all the devices of which the inputs are in the Hi-z state, like a gate of a metal oxide semiconductor (MOS), a gate of a thin film transistor (TFT), or the like may be used instead of the buffer 14-1. The reason of making the output terminal 12-1 of the charging means 12 and the touch detector 14 in the Hi-z state is that since no discharge path for charge isolated in the Hi-z state is present, such that the magnitude of voltage formed at point P of FIG. 9 is kept long, it is easy to relatively accurately detect the magnitude of voltage.

The signal output from the buffer 14-1 is input to the amplifier 14-2. Depending on whether the touch is generated, when the variation of the voltage detected at the point P of FIG. 9 is small, it is preferable to amplify the signal using the amplifier 14-2. The amplifier may use a DAC 14-3 which is generated using a reference voltage 14-4.

Further, the signal which is detected and amplified by the touch detector 14 may pass through an ADC converter 14-5 to be transferred to the signal processor 35 of FIG. 13. One or a plurality of ADC converters 14-5 may be used. When the plurality of ADC converters 14-5 are used, the signal processing may be more quickly made.

Although not illustrated in FIG. 9, a filter may be used among several function units which are displayed in the touch detector 14. For example, a filter may also be used in a previous stage of the buffer 14-1 and a filter may be used in a previous stage of the amplifier 14-2 or some of the components of the amplifier. As the filter, various filters such as a bandwidth low pass filter, a bandwidth high pass filter, a grass cut filter (GCF), a ranking filter, and an average filter using chopping may be used.

The touch detection sensor 10 is made of a transparent conductor or metal. When the touch detection sensor 10 is installed on a display device and is made of a transparent conductor, the transparent conductor may be transparent conductive materials such as indium tin oxide (ITO), antimony tin oxide (ATO), carbon nano tube (CNT), and indium zinc oxide or transparent materials having conductive properties similar thereto. If the touch detection sensor 10 is used as touch keyboard which is not used along with the display device and a touch key of a refrigerator or a monitor, the touch detection sensor 10 may also be made of a non-transmitting material such as metal.

The sensor signal line 22 is a signal line which connects polarity of the touch capacitance formed when the touch means such as a finger 25 approaches the touch detection sensor 10 to the touch detector 14 and uses the same mask as the touch detection sensor 10 and may be made of a transparent conductive material. In some case, the sensor signal line 22 uses a different mask from the touch detection sensor 10 and may also be made of a non-transmitting material such as metal. The magnitude of resistance of the sensor signal line 22 is represented by Rt and the magnitude of resistance of the non-sensing pad 10b is represented by Rnt.

The resistance components act as a factor of generating a delay of a signal at the time of the detection of the touch signal. Therefore, the smaller the magnitude of the resistance component, the better becomes. Therefore, to reduce the resistance, the width of the sensor signal line 22 connected to the touch detection sensor 10 which is disposed at a long distance in the TDI is preferably wide. The width of the sensor signal line 22 of the touch detection sensor 10 which is disposed at a short distance in the TDI is narrow, and thus an absolute resistance value is small even though the resistance is increased. Therefore, it is preferable to make the width of the path through which the sensor signal lines pass narrow by making the width of the sensor signal line 22 of the touch detection sensor 10 at a shorter distance in the TDI narrow. As such, according to the present invention, the width of the sensor signal lines may be differently formed depending on the position of the touch detection sensor 10.

The common electrode capacitor Cvcom of FIGS. 8 and 9 is a capacitance formed when the touch detection sensor 10 is opposite to the common electrode of the display device and one side thereof is connected to the touch detector 14 and the other side thereof is connected to the common voltage of the display device. In this case, the common electrode capacitor is applied by being directly connected to the common voltage of the display device, but the common electrode capacitor (Cvcom) is generally electromagnetically induced through medium such as glass or air.

Referring back to FIG. 9, when the finger 25 of the human body approaches the touch detection sensor 10 at a predetermined interval, the touch capacitance called "Ct" is formed between the finger 25 and the touch detection sensor 10. The Ct is a value set by the relation Equation C=(eA)/d of FIG. 7 and may be controlled by controlling the interval, the opposing area, etc., of the touch means such as the finger 25 and the touch detection sensor 10. For example, as the area of the touch detection sensor 10 is increased, the Ct is also increased depending on the relation Equation of FIG. 7.

On the contrary, as the area of the touch detection sensor 10 is reduced, the Ct is reduced. According to one embodiment, the Ct may be designed from several femto Farada (fF) to tens of micro Farad (uF).

The Cp of FIG. 9 is a parasitic capacitor and is an equivalent circuit of the parasitic capacitors which are formed by a wire bonding between a semiconductor and a package which are formed in the TDI or configure the TDI. The parasitic capacitor may be configured of the plurality of parasitic capacitors Cp of which the grounds are different. In the present specification, only one parasitic capacitor connected to only one ground is illustrated.

Referring back to FIG. 9, the $V_{pre}$ which is a precharge voltage is applied to the input terminal 12-2 (FIG. 8) of the charging means 12 and when the switching device which is the charging means 12 is turned on by a control voltage Vg applied to the on/off control terminal cont, the precharge voltage $V_{pre}$ is output through the output terminal 12-1. Therefore, all the capacitors connected to the output terminal 12-1 of the charging means 12 are charged with the precharge voltage $V_{pre}$.

According to one embodiment, if the switching device which is the charging means 12 is turned on when the $V_{pre}$ is 3V and the Vg is changed from zero volt (0V) to 10V, the potentials of the touch capacitor Ct, the equivalent capacitor between lines Ceq, the parasitic capacitor Cp, and the common electrode capacitor Cvcom which are formed between the sensing pad 10a detecting the touch and the finger 25 after the turn on of the switching device are 3V based on a ground potential which is connected to one side of each capacitance. For example, if the Vcom which is the common voltage is 4V, when the potential of the point P of FIG. 9 is 3V, the potential 3V of the common electrode capacitance Cvcom means 3V (that is, P potential is 7V based on Vcom=4V) when the common voltage Vcom is 4V.

After the charging of the point P of FIG. 9, when the control voltage Vg of the charging means 12 drops from 10V to 0V to turn off the charging means 12, the point P which is the touch detector becomes Hi-z and thus the charge at the point P is isolated in the touch capacitor Ct, the equivalent capacitor between lines Ceq, the parasitic capacitor Cp, and the common electrode capacitor Cvcom. According to one embodiment, when the alternating voltage is applied to the equivalent capacitor Ceq between lines, the magnitude of voltage detected at the point P is proportional to the magnitude of alternating voltage applied to the equivalent capacitor between lines Ceq and has a correlation with the capacitances connected to the point P.

FIG. 10 is a cross-sectional view illustrating an example of a configuration of a touch detection sensor according to the embodiment of the present invention and FIG. 11 is a cross-sectional view illustrating another example of a configuration of a touch detection sensor according to the embodiment of the present invention. FIG. 10 illustrates that the touch detection sensor 10 is mounted on the substrate separately formed from the display device and FIG. 11 illustrates that the touch detection sensor 10 is embedded in the display device. The formation relationship of the common electrode capacitor Cvcom will be described below with reference to FIGS. 10 and 11.

As illustrated in FIG. 10, a display device 200 has a common electrode 220. An AMOLED or a plasma display panel (PDP) does not have a common electrode with a function for displaying an image quality, but various potentials formed on the TFT substrate of the AMOLED or the driving substrate of the PDP and the Cvcom of FIGS. 8 and 9 is formed between the touch detection sensors 10 opposite thereto, and therefore a virtual potential formed of various potentials formed on the TFT substrate of the AMOLED or the driving substrate of the PDP is also called the common electrode.

The display device 200 may be various types of display devices as described above and the common electrode 220 may be a Vcom electrode of an LCD or other types of electrodes. An embodiment of FIG. 10 illustrates an LCD among the display devices.

The display device 200 illustrated in FIG. 11 has a structure in which a liquid crystal is sealed between a TFT substrate 205 at a lower portion and a color filter 215 at an upper portion to form a liquid crystal layer 210. To seal the liquid crystal, outer portions of the TFT substrate 205 and the color filter 215 are bonded to each other by a sealant 230. Although not illustrated, a polarizer is attached to the upper and lower portions of the liquid crystal panel. In addition, optical sheets configuring a back light unit (BLU) and a brightness enhancement film (BEF) may be installed like the BLU.

As illustrated, the touch screen panel 50 is installed on the display device 200. An outer portion of the touch screen panel 50 illustrated in FIG. 11 is attached to the upper portion of the display device 200 by an adhesive member 57 (FIG. 11) such as a double adhesive tape (DAT). Further, an air-gap 58 is formed between the touch screen panel 50 and the display device 200 or a contact member 58 is charged therebetween. The contact member 58 is materials such as transmitting silicon, an optically clear adhesive (OCA), and adhesive resin which attach between the touch screen panel 50 and the display device 200.

A common voltage level for displaying an image is applied to the common electrode 220 of the display device 200 and the common voltage may be a DC voltage having a predetermined magnitude or may be an AC voltage having a predetermined amplitude alternating at a predetermined frequency. For example, in a small LCD with a line inversion, the common voltage of the common electrode 220 alternates as illustrated in FIG. 5 and in the LCD such as a notebook and a monitor/TV with a dot inversion, the common voltage having a DC level which is a voltage having a predetermined magnitude is applied.

As illustrated, the common electrode capacitor Cvcom is formed between the touch detection sensor 10 and the common electrode 220 of the display device 200 and the touch capacitance Ct is formed between the touch detection sensor 10 and the finger 25. As such, the common electrode capacitance Cvcom and the touch capacitance Ct are formed in the touch detection sensor 10 together.

Meanwhile, reference numeral 24 in FIG. 11 is a protective layer for protecting the touch detection sensor 10, and glass, plastic, vinyl, cloth, etc., are used.

FIG. 11 is another example of the configuration of the touch detection sensor and illustrates an embodiment that the touch detection sensor 10 is embedded in the display device. Referring to FIG. 11, the touch screen panel 50 may be formed on an upper surface of the color filter 215 which is a part of the display device. As illustrated, the common electrode 220 is formed under the color filter 215 and the touch detection sensor 10 is patterned on the upper surface of the color filter. In the embodiment of FIG. 11, the protective layer 24 may be replaced by a polarizer. Even in the embodiment of FIG. 11, the common electrode capacitance Cvcom is formed between the common electrode 220 and the touch detection sensor 10 and thus the common electrode capacitance Cvcom (between the touch detection sensor 10 and the common electrode 220 of the display device 200) and the touch capacitance Ct (between the touch detection sensor 10 and the finger 25) are formed in the touch detection sensor 10 together.

FIG. 12 illustrates the embodiment that the alternating voltage is applied to the equivalent capacitor between lines Ceq to detect the touch signal.

Referring to FIG. 12, the touch capacitance Ct, the Ceq, the Cvcom, and the Cp formed between the touch detection sensor 10 and the conductors such as the finger 25 are connected to the output terminal 12-1 of the charging means 12. Therefore, when the precharge signal $V_{pre}$ is applied to the input terminal 12-2 of the charging means 12 in the state in which the charging means 12 is turned on, the Ceq, the Ct, the Cvcom, and the Cp are charged at the precharge level $V_{pre}$ and thus the potential of the input terminal of the touch detector 14 becomes the precharge level $V_{pre}$. Next, when the charging means 12 is turned off, the signals charged in four capacitors keep the precharge signal level $V_{pre}$ as long as it is separately discharged.

To stably isolate the charged signal, the output terminal 12-1 of the charging means 12 and the input terminal of the touch detector 14 are in the Hi-z state. Preferably, the output terminal 12-1 of the charging means 12 and the input terminal of the touch detector 14 may have the impedance of at least 100 Kohm.

However, according to another embodiment, the output terminal 12-1 of the charging means 12 and the input terminal of the touch detector 14 may not be in the Hi-z state. For example, when the touch input is observed while the signals charged in four capacitors are discharged, the charged signal by other means is isolated, or the signal is quickly observed at the time of the discharge starting timing, the input terminal of the touch detector 14 needs to be Hi-z.

The touch detector 14 detects the voltage (or voltage at the point P) of the sensing pad 10a. The touch detector 14 detects the voltage at the point P when the touch is not generated (that is, when the Ct is not formed) and detects the voltage at the point P to acquire the touch signal using the difference in magnitude between the two detected voltages, when the touch is generated (that is, when the Ct is formed). According to the embodiment of FIG. 12, the sensing signal line resistance Rt is present at the sensing pad 10a and the input terminal of the touch detector which is the point P, but the sizes of the signals across the Rt after a predetermined time are the same and therefore the effect of the Rt disregards. Therefore, in the present specification, the voltage detected by the sensing pad 10a and the voltage detected at the point P have the same meaning.

In the present invention, when the point P of FIG. 12 is charged with the charging voltage $V_{pre}$, one side of the non-sensing pad signal line 22b connected to the non-sensing pad 10b is connected to a predetermined voltage $V_l$ or $V_h$. The $V_l$ is a low voltage of the alternating voltage of the present invention and the $V_h$ is a high voltage of the alternating voltage of the present invention, in which the alternating voltage alternates between the $V_h$ and the $V_l$. The $V_h$ or the $V_l$ serves like the VLb1 described above, that is, serves to form the equivalent capacitor between lines Ceq.

To detect the touch signal after the charging voltage $V_{pre}$ is applied and the predetermined time lapses, the alternating voltage is applied to the non-sensing pad signal line 22b. An absolute magnitude of the alternating voltage is $V_h$-$V_l$ and the potential may be changed from the high voltage $V_h$ to the low voltage $V_l$ or from low voltage $V_l$ to the high voltage $V_h$. The alternating voltage is voltages having various forms like a square wave, a triangular wave, a sine wave, or a sawtooth wave and the touch drive IC (TDI) of the present invention may change the magnitude or the frequency of the alternating voltage.

The touch detector 14 detects a voltage in synchronization with a rising edge or a rising time at which the alternating voltage rises from the low voltage $V_l$ to the high voltage $V_h$ or a falling edge or a falling time at which the alternating voltage falls from the high voltage $V_h$ to the low voltage $V_l$. When the TDI detects the voltage in synchronization with the rising or falling edge, it is preferable to detect the voltage after being delayed as much as a predetermined time from the edge. The reason is that some time (for example, tens of nano seconds or tens of micro seconds) is required until the detection voltage is stabilized by the resistance component Rt of the sensing pad signal line 22a or the resistance component Rnt of the non-sensing pad.

Further, the electromagnetic wave generated at the rising edge or the falling edge of the alternating voltage may affect devices coupled with the capacitive type touch detection means of the present invention and therefore the TDI of the present invention may further include a method for adjusting a gradient of the rising edge or the falling edge of the alternating voltage. As one embodiment of the method for adjusting a gradient in the TDI, a register may be used. In the plurality of registers, the time of the rising edge or the time of the falling edge is mapped and when one of the plurality of registers is selected, the alternating voltage generator 42 of FIG. 13 may adjust the gradient of the rising edge or the gradient of the falling edge of the alternating voltage.

Suppose that the $V_h$ is 5V and the $V_l$ is 0V, the absolute magnitude $V_h$-$V_l$ of the alternating voltage is 5V. When the alternating voltage is changed from low to high, the alternating voltage is +5V which is a positive polarity and when the alternating voltage alternates from high to low, the alternating voltage is −5V which is a negative polarity. The polarities are applied to Equation for detecting the touch signal to be described below.

When the P point of FIG. 12 is charged with the charging voltage $V_{pre}$, suppose that the voltage applied to the non-sensing pad signal line 22b is $V_h$ or $V_l$, the equivalent capacitor between lines Ceq is charged with a voltage having a difference between the $V_{pre}$ and the $V_h$ or a difference between the $V_{pre}$ and the $V_l$. For example, when the Ceq is charged with the $V_{pre}$, if a first voltage connected to the non-sensing pad signal line 22b is the high voltage $V_h$, the alternating voltage alternates from high $V_h$ to low $V_l$ and the polarity of the alternating voltage is negative (−). Further, when the Ceq is charged with the $V_{pre}$, if the first voltage connected to the non-sensing pad signal line 22b is the low voltage $V_l$, the alternating voltage alternates from low $V_l$ to high $V_h$ and the polarity is positive (+).

The voltage detected by the touch detector 14 by the alternating voltage applied to the non-sensing pad signal line 22b is as follows.

1. The voltage detected when the touch is not generated.

$$Vsensor_{nontouch} = Vpre + (Vh - Vl)\frac{Ceq}{Ceq + Cvcom + Cp} \quad \text{[Equation 1]}$$

2. The voltage detected when the touch is generated.

When the touch is generated, the touch capacitance Ct is added to the touch detector 14 and therefore the voltage detected by the touch detector 14 is determined by the following <Equation 2>.

$$Vsensor_{touch} = Vpre + (Vh - Vl)\frac{Ceq}{Ceq + Cvcom + Cp + Ct} \quad \text{[Equation 2]}$$

In the above <Equation 1> and <Equation 2>, $Vsensor_{nontouch}$ represents the voltage detected by the touch detector 14 when the touch is not generated, $Vsensor_{touch}$ represents the voltage detected by the touch detector 14 when the touch is generated, $V_{pre}$ represents the precharge voltage, $V_h$ represents the high level voltage of the alternating voltage applied to the non-sensing pad signal line 22b, $V_l$ represents the low level voltage of the alternating voltage applied to the non-sensing pad signal line 22b, Cvcom represents the common electrode capacitance, the Cp represents the parasitic capacitance, and the Ct represents the touch capacitance. When the alternating voltage alternates from low to high, the polarity of $(V_h-V_l)$ is positive (or plus) and when the alternating voltage alternates from high to low, the polarity of (Vh-Vl) is negative (or minus).

Describing the difference between the above <Equation 1> and <Equation 2>, the Ct is present at a denominator of the above <Equation 2>. The touch capacitance Ct is the capacitor between the sensing pad 10a and the touch means such as a finger 25, and therefore the capacitance which is the magnitude of Ct is changed depending on whether the touch is generated or the opposing distance or the opposing area of the touch means and the touch sensing pad 10a. Since the difference of Ct induces the difference in voltage which is induced by the above <Equation 1> and <Equation 2>, it is determined whether the touch is generated or it is possible to calculate the touched area by detecting the voltage difference (<Equation 1>-<Equation 2> or <Equation 2>-<Equation 1>).

The above <Equation 1> is the value detected by the touch detector 14 when the touch is not generated and therefore is a fixed value. However, when the touch capacitance is added like the above <Equation 2>, the voltage detected by the touch detector 14 has the changed touch capacitance and therefore the magnitude of the voltage detected by the above <Equation 2> is changed. The present invention detects whether the touch is generated or the touched area depending on the voltage difference between the above <Equation 1> and <Equation 2> or the voltage difference between the above <Equation 2> and <Equation 1>, and therefore the voltage of the above <Equation 1> which is the fixed value may be preferably stored in a storage device (memory) 28 (FIG. 13).

If the voltage of the above <Equation 1> stored in the memory unit 28 (FIG. 13) is replaced by the DAC 14-3, <Equation 1>-<Equation 2> or <Equation 2>-<Equation 1> may be detected by a simple circuit like a differential amplifier. Therefore, when the touch is not generated, the present invention has a means for storing the voltage detected by the touch detector 14 in the above <Equation 1> form in the memory and has a means for replacing the voltage at the time of the non-touch stored in the memory by the DAC 14-3.

For example, when the voltage detected by the touch detector 14 at the time of the non-touch of the sensing pad 10a of FIG. 8 is 3V, the DAC displaying the voltage at the time of the non-touch of the sensing pad 10a of FIG. 8 is 3V. Further, the DAC may display 3V, including a predetermined offset. For example, when the DAC is 3.5 V, the DAC includes an offset of 0.5 V.

As such, the voltage detected by the touch detector 14 is stored in the memory at the time of the non-touch of all the touch detection sensors 10 to detect the difference from the voltage detected by the touch detector when the corresponding touch detection sensor 10 is operated as the sensing pad, thereby easily detecting whether the touch is generated and the touched area.

Meanwhile, the $V_h$ and the $V_l$ are generated in the power supply unit 47 (FIG. 13) in the TDI and the alternating of the $V_h$ and the $V_l$ is generated by the alternating voltage generator 42 (FIG. 13) in the TDI.

Meanwhile, the Cvcom may be obtained by the following <Equation 3>.

$$Cvcom = \epsilon 1 \frac{S1}{D1} \quad \text{[Equation 3]}$$

In the above <Equation 3>, $\epsilon_1$ is complex permittivity of vehicles which are present between the touch detection sensor 10 and the common electrode 220. In the case of FIG. 10, the glass, the air layer, the polarizer, and the adhesive for attaching the polarizer to the glass may be present between the touch detection sensor 10 and the common electrode 220, and therefore the complex permittivity thereof is $\epsilon_1$ of the above Equation 3. $S_1$ is the opposing area of the touch detection sensor 10 and the common electrode 220 and therefore may be easily obtained. As illustrated in the example of FIG. 10, when the common electrode 220 is formed over a lower surface of the color filter 215, the opposing area $S_1$ is determined by the area of the touch detection sensor 10. Further, $D_1$ is a distance between the touch detection sensor 10 and the common electrode 220, and therefore corresponds to a thickness of the vehicle.

As described above, the Cvcom is a value which may be easily obtained and a value which may be set in advance.

The Ct may be obtained by the following <Equation 4>.

$$Ct = \epsilon 2 \frac{S2}{D2} \quad \text{[Equation 4]}$$

In the above <Equation 4>, $\epsilon_4$ may be obtained from the vehicle between the touch detection sensor 10 and the finger 25 and may be obtained by the complex permittivity of the vehicles when a plurality of vehicles are used. If the tempered glass is attached on the upper surface of the touch screen panel 50 in FIG. 10, the permittivity $\epsilon_2$ may be obtained from a value obtained by multiplying specific permittivity of the tempered glass by permittivity of vacuum. $S_2$ corresponds to the opposing area of the sensing pad 10a and the finger 25. If the finger 25 completely covers any sensing pad 10a, $S_2$ corresponds to the area of the touch detection sensor 10. If the finger 25 covers a part of the touch detection sensor 10, $S_2$ is reduced by an area which is not opposite to the finger 25 in the area of the sensing pad 10a. Further, $D_2$ is the distance between the sensing pad 10a and the finger 25, and therefore corresponds to the thickness of the protective layer 24 which is put on the upper surface of the touch screen panel 50. As described, the Ct is a value which may be easily obtained and is a value which may be easily set using a material and a thickness of the protective layer 24, the tempered glass, etc., which is put on the upper surface of the touch screen panel 50. Depending on the above <Equation 4>, the Ct is proportional to the opposing area of the finger 25 and the touch detection sensor 10, and therefore the touch occupancy ratio of the finger 25 for the touch detection sensor 10 may be calculated. A method for calculating the touch occupancy ratio of the finger 25 is as follows. Referring to the above <Equation 1> and <Equation 2>, the difference is the difference in the existence and non-existence of the touch capacitance Ct depending on whether the touch is generated. Suppose that all the capacitances cited in the above <Equation 1> has the predetermined fixed magnitude and the $V_{pre}$ is the fixed value, only the Ct may be extracted by the voltage detected in the above <Equation 1> and <Equation 2>. In the above <Equation 4>, when the $\epsilon_2$ and the $D_2$ are fixed values, the touch capacitance Ct is proportional to only the touch area. Therefore, the touched area may be simply obtained by the extracted Ct. When obtaining the area using the above <Equation 1> and <Equation 2>, both of the voltage detected by the above <Equation 1> and the voltage detected by the above <Equation 2> are used. Further, the present invention may operate the touched area based on the voltage detected by the touch detector 14. FIG. 13 is a configuration diagram illustrating one embodiment of the touch screen panel according to the present invention and illustrates the example in which the touch detection sensors 10 are arranged in a dot matrix form. A lower portion of FIG. 13 is provided with a configuration of the touch drive IC (TDI) 30. The TDI 30 may include a driver 31, the touch detector 14, a timing controller 33, a signal processor 35, a memory unit 28, an alternating voltage generator 42, a power supply unit 47, and a communication unit 46 and may further include a CPU 40. The CPU 40 is a microprocessor having an operation function and may be positioned outside the TDI 30. The driver 31 has the charging means 12 and includes a function of selecting the sensing pad and the non-sensing pad among the plurality of touch detection sensors 10 and connecting the selected pad to the touch detector 14. Further, the driver 31 includes a function of connecting one side of the non-sensing pad signal line 22b to the $V_l$, or $V_l$ during the charging operation using the charging means 12. Referring to the above <Equation 1> or <Equation 2>, the difference in the magnitude of the detection voltage occurs due to the magnitude of $V_h$-$V_l$ which is the alternating voltage, and therefore to adjust the touch sensitivity, the TDI may further include a means for changing the magnitude of the alternating voltage. The larger the alternating voltage, the larger the detection voltage, which means the detection sensitivity is improved. The TDI is provided with a register for controlling the magnitude of $V_h$-$V_l$ which is the size of the alternating voltage therein. According to one embodiment, the register has a plurality of addresses and different magnitudes of alternating voltage is mapped to each address. The magnitude of alternating voltage corresponding to the value of the selected register is transferred to the driver 31 and is applied at the time of the detection of the touch signal. The timing controller 33 serves to generate a plurality of different clocks which are required in the TDI. For example, a clock is required to operate the CPU 40 and a clock is required to operate the ADC or sequentially operate a multiplexer of the driver 31. As such, the clocks required for each function may be several and the timing controller 33 may generate and supply a plurality of various clocks. The signal processor 35 supplies the ADC value generated by the touch detector 14 to the CPU 40, controls the communication unit 46 to transmit the ADC value to the outside of the TDI 30 through an inter integrated circuit (I2C) or a serial peripheral interface bus (SPI) signal line, or generates and supplies signals required in all functional elements inside the TDI 30 such as the touch detector 35 or the driver. The functional element or the functional block is called components for performing each function illustrated in FIG. 13. For example, nine functional blocks are included inside the current TDI and the CPU 40 is one of the functional blocks. The signal processor 35 accommodates the ADC value generated in the touch detector 14 in the memory unit 28 and/or performs the required operation. For example, the signal processor 35 may refer to the ADC value generated in the touch detector 14 to operate the touched area due to the touch detection sensor 10 and the touch of the touch means and may operate the touch coordinates using the ADC value or the operated area value. The memory unit 28 is configured of a flash memory, an E2PROM, an SRAM, or a DRAM. The flash memory or the E2PROM is stored with several register values required to driving the TDI 30 or programs required to operate the CPU 40. The CPU 40 may have many functions overlapping with those of the signal processor 35. Therefore, the CPU 40 may not be included in the TDI 30 or positioned outside the TDI 30. Any one of the CPU 40 and the signal processor 35 may not temporarily used in a section in which the overlapping performance of the CPU 40 and the signal processor 35 is predicted. The CPU may perform most of roles which are performed by the signal processor 35 and performs various functions of extracting the touch coordinates or performing gestures such as zoom, rotation, and move. Further, the CPU may process data in various forms by operating the area of the touch input to generate a zooming signal, calculating the strength of the touch input, and recognizing only GUI object desired by the user (for example, having large detected area) as a valid input when GUI objects such as a keypad are simultaneously touched, etc., and use the data inside the TDI 30 or transmit the data to the outside through a communication line.

The program for controlling the CPU 40 is installed in the memory unit 28 and may be replaced by new program when modifications are generated. The new program may be performed using a communication bus included in the communication unit 46, serial communications of, for example, I2C, SPI, USB, etc., or parallel communication such as a CPU interface (hereinafter, I/F). The communication unit 46 serves to output the required information to the outside of the TDI 30 or input information provided from the outside of the TDI 30 to the inside of the TDI. The communication unit uses the serial communication such as the I2C and the SPI or the parallel I/F such as the CPU interface. The alternating voltage generator 42 generates the alternating voltage applied to the equivalent capacitor between lines Ceq. The high voltage $V_h$ and the low voltage $V_l$ of the alternating voltage are generated from the power supply unit 47 and the alternating voltage generator 42 combines the high voltage $V_h$ and the low voltage Vl to generate the alternating voltage, such that the driver 31 may use the alternating voltage. Further, the alternating voltage generator 42 has a method for adjusting a gradient of a rising edge or a falling edge of the alternating voltage. The sensing pad detecting the touch signal according to the embodiment of FIG. 13 is configured in one or in plural. However, the sensing pad is preferably configured in plural to reduce the sensing time. The sensing pads may be randomly selected and may be selected column-by-column or row-by-row from 30 touch detection sensors 10 which are configured of six rows Row1 to Row5 and five columns Col1 to Col5. According to one embodiment of the present invention, row and column coordinates are set based on the position of the TDI. Therefore, the coordinates of row and column of the touch detection sensor are not fixed but are values which may be relatively changed depending on the setting position of the TDI. According to the embodiment of selecting the sensing pads column-by-column, when six touch detection sensors 10 included in Col1 are simultaneously determined as the first sensing pad, all the six touch detection sensors 10 included in the Col1 are operated as the sensing pad. (In this case, Col2 to Col5 are operated as the non-sensing pad). However, in this case, the foregoing equivalent capacitor between lines Ceq is not formed but even though the equivalent capacitor between lines Ceq is formed, the magnitude of capacitance is small, and therefore the touch detection sensitivity may be reduced. As a result, the sensing row-by-row is more preferable than the sensing column-by-column. The reason is that in the case of the sensing row-by-row, a sensing pad signal line 22 just next thereto is not present and therefore a problem of malfunction due to the signal interference does not happen. All the touch detection sensor 10 included in the Row2 to Row6 are operated as the non-sensing pad while the Row1 is selected as the sensing pad and thus five touch detection sensors 10 included in the Row1 are operated as the sensing pad. When the Row1 completes a function as the sensing pad, the Row2 sequentially becomes the sensing pad and the Row1 and the Row3 to Row6 operated as the non-sensing pad are sequentially repeated. In the Row1, the five touch detection sensors 10 are operated as the sensing pad and therefore the TDI preferably includes five drivers 31. As a result, the five sensing pads are simultaneously driven to reduce the touch detection time. Meanwhile, referring to the first characteristic of the two characteristics of the sensing equivalent capacitor between lines Ceq as described above, the sensing equivalent capacitance Ceq when the Row1 is operated as the sensing pad is larger than the sensing equivalent capacitance Ceq when the Row6 is operated as the sensing pad. The reason is that a length of the sensor signal line 22 connected to the touch detection sensor 10 positioned at the Row1 is longer than that of the sensor signal line 22 connected to the touch detection sensor 10 positioned at the Row6. As such, the longer distance in the TDI, the larger the magnitude of the sensing equivalent capacitance Ceq formed in the sensing pad. Therefore, it is preferable to compensate for different magnitudes of sensing equivalent capacitances Ceq to detect the uniform touch signal. The compensating for the magnitude of the sensing equivalent capacitance Ceq means that the compensation capacitor is added to the sensing equivalent capacitance Ceq of <Equation 1> or <Equation 2> to detect the same voltage for the same touch capacitance Ct even though the position of the sensing pad is changed.

The present invention has a means for compensating for different magnitudes of sensing equivalent capacitance Ceq to keep the same touch sensitivity at each position based on the different magnitudes of sensing equivalent capacitance Ceq at each position.

FIG. 14 illustrates a method for compensating for sensing capacitance Ceq according to the embodiment of the present invention. Referring to FIG. 14, a compensation capacitor Cba1 is connected to the touch detector 14 and one side of the compensation capacitor Cba1 is applied with the alternating voltage. As a result, the Ceq and the Cba1 are connected to each other in parallel and thus the Ceq may be large as much as the magnitude of Cba1 in an equivalent circuit.

According to one embodiment, the alternating voltage applied to the compensation capacitor Cba1 may be the same voltage as the alternating voltage applied to the equivalent capacitor between lines Ceq.

According to another embodiment, one side of the compensation capacitor Cba1 may be applied with a voltage having a different magnitude (amplitude) from the alternating voltage applied to the equivalent capacitor between lines Ceq. For example, one side of the compensation capacitor Cba1 may be connected to GND having a zero volt (V) or a direct current (DC) having a predetermined potential. However, for simplification of the power supply unit 47 and the alternating voltage generator 42, the alternating voltage applied to the equivalent capacitor between lines Ceq and the compensation capacitor Cba1 is preferably the same and in the present specification proposes the embodiment of the case in which the alternating voltage is the same.

When five touch detection sensors 10 included in the Row1 of FIG. 13 is used as the sensing pad, suppose that the magnitude of the sensing equivalent capacitance Ceq generated in the sensing pad 10a of the col3 of the Row1 is 15 pF, when the Row2 is used as the sensing pad, suppose that the magnitude of the sensing equivalent capacitance Ceq generated in the sensing pad of the col3 of the Row2 is 13 pF, and when the Row6 is used as the sensing pad, suppose that the magnitude of the sensing equivalent capacitance Ceq generated in the sensing pad of the col3 of the Row6 is 5 pF. If the magnitude of the Cba1 is selected as 0 pF when the Row1 is used as the sensing pad and the magnitude of the Cba1 is selected as 2 pF when the Row2 is used as the sensing pad, the magnitude of the capacitor is the same as 15 pF which is the Ceq of the Row1 and if the magnitude of the Cba1 is selected as 10 pF when the Row6 is used as the sensing pad, the Ceq is 5 pF and therefore the magnitudes of all the capacitors in which the Cba1 which is 10 pF is compensated for 5 pF which is the Ceq of the Row6 are 15 pF which is equal to 15 pF of the Row1. As such, if the capacitance is compensated as much as an amount corresponding to the difference in the Ceq at each Row by adjusting the magnitude of the Cba1 so that the sum of the compensated magnitude of the Cba1 and the Ceq is a constant value (for example, 15 pF), the sensing equivalent capacitance Ceq having 15 pF at each Row is induced.

In the present specification, the set magnitudes (for example, 0 pF, 2 pF, 10 pF, and 15 pF) of the compensation capacitor are one embodiment and the sum of the sensing equivalent capacitance Ceq and the compensation capacitance Cba1 is desirably defined to be matched based on the magnitudes of the sensing equivalent capacitance Ceq detected at each Row.

When one side of the compensation capacitance Cba1 is connected to the touch detector 14 and the other side thereof is applied with the same alternating voltage as the alternating voltage applied to the equivalent capacitor between lines Ceq, the voltage detected by the touch detector 14 is as follows.

1. The voltage detected when the touch is not generated.

$$Vsensor_{nontouch} = Vpre + (Vh - Vl)\frac{Ceq + Cbal}{Ceq + Cabl + Cvcom + Cp} \qquad \text{[Equation 5]}$$

2. The voltage detected when the touch is generated.

When the touch is generated, the touch capacitance Ct is added to the touch detector 14 and therefore the voltage detected by the touch detector 14 is determined by the following <Equation 6>.

$$Vsensor_{touch} = \qquad \text{[Equation 6]}$$
$$Vpre + (Vh - Vl)\frac{Ceq + Cbal}{Ceq + Cbal + Cvcom + Cp + Ct}$$

In the above <Equation 5> and <Equation 6>, $Vsensor_{nontouch}$ represents the voltage detected by the touch detector 14 when the touch is not generated, $Vsensor_{touch}$ represents the voltage detected by the touch detector 14 when the touch is generated, $V_{pre}$ represents the precharge voltage, $V_h$ represents the high level voltage of the alternating voltage applied to the non-sensing pad signal line 22b and one side of the compensation capacitor Cba1, $V_l$ represents the low level voltage of the alternating voltage applied to the non-sensing pad signal line 22b and one side of the compensation capacitor Cba1, Cvcom represents the common electrode capacitance, the Cp represents the parasitic capacitance, and the Ct represents the touch capacitance. When the alternating voltage alternates from low to high, the polarity of $(V_h-V_l)$ is positive (or plus) and when the alternating voltage alternates from high to low, the polarity of $(V_h-V_l)$ is negative (or minus).

Referring to <Equation 5> and <Equation 6>, in the embodiment of FIG. 13, it is possible to equally keep the touch sensitivity at each Row by the compensation capacitance Cba1 compensating for different sensing equivalent capacitance Ceq at each Row.

Further, referring to <Equation 5> and <Equation 6>, when the magnitude of the touch equivalent capacitance Ceq generated at each Row is small, it is possible to greatly improve the touch sensitivity using the Cba1.

Further, referring to <Equation 5> and <Equation 6>, in the state in which a portion not applying the alternating voltage to the Ceq but applying the alternating voltage to the Ceq is connected to the GND or floats, when the alternating voltage is applied only to one side of the compensation capacitor Cba1 connected to the touch detector 14, the Ceq of the <Equation 1> or <Equation 2> is replaced by the Cba1. As such, according to the present invention, the capacitor applied with the alternating voltage is included in a denominator and a numerator of Equation representing the detection voltage.

The present invention has a means for compensating for the magnitude of the sensing equivalent capacitance Ceq based on the different magnitudes of sensing equivalent capacitance Ceq. The TDI 30 includes a means for determining the magnitude of compensation capacitor Cba1. According to an embodiment of the means, a plurality of registers are mapped with the compensation capacitance Cba1 having different magnitudes and in the embodiment of FIG. 13, are assigned with the Cba1 having different magnitudes at each Row.

Meanwhile, referring to the above <Equation 1> or <Equation 2>, the detection voltage detected by the touch detector 14 is proportional to $(V_h-V_l)$ and therefore when the magnitude of alternating voltage is appropriately adjusted, it is possible to adjust the touch sensitivity by adjusting the magnitude of voltage detected by the touch detector 14. The TDI includes a means for changing a magnitude of alternating voltage. According to the embodiment, the plurality of registers in the TDI are assigned with the alternating voltage having different magnitudes and the magnitude of alternating voltage may be determined by the selection of the register.

FIG. 15 illustrates an embodiment in which the magnitude of alternating voltage is changed depending on the setting of the register included in the TDI. Referring to FIG. 15, when a register address 00h is selected, the alternating voltage is 2V and when a register address 07h is selected, the alternating voltage is 16V.

As such, the touch detection apparatus according to the foregoing embodiment changes the alternating voltage to adjust the magnitude of detection voltage associated with the touch sensitivity.

Referring to FIG. 12 or 14, according to the capacitive type touch detection means and the detection method according to the present invention, the alternating voltage is applied to one side of the capacitors Ceq and Cba1 connected to the touch detector 14 which is in the Hi-state and the touch may be detected depending on whether the touch capacitance Ct is generated. Therefore, when any capacitor connected to the touch detector 14 which is in the Hi-z state is applied with the alternating voltage, the touch detection may be made. Here, the fact that the touch detector 14 is in the Hi-z state means that the charging means 12 is in the turn off state, the output terminal 12-1 of the charging means 12 is in the Hi-z state, the input unit of the touch detector 14 is in the Hi-z state, and the point P of FIG. 12 is in the Hi-z state.

FIG. 16 is a diagram illustrating an embodiment of the present invention having an alternating touch means. FIG. 16 is a modification of the embodiment in which the touch capacitance Ct is formed between the touch detection sensor 10 and the finger 25 of FIG. 12, which is different from the fact that the alternating touch means 26 is adopted instead of the finger 25. That is, this is the same as one described in FIG. 12, except that the touch capacitance Ct is formed between the touch detection sensor 10 and the alternating touch means 26.

An embodiment of the alternating touch means 26 may be a touch pen having a pen shape. Referring to FIG. 16, the alternating touch means 26 may include the alternating voltage generator 42 (FIG. 13). In the alternating voltage generator 42 (FIG. 13), the alternating touch means 26 includes the connecting line 18 to a lead of the pen (nib) 17, and the alternating voltage generated from the alternating voltage generator 42 (FIG. 13) is transferred to the lead of the pen through the connecting line 18. The alternating voltage generator 42 (FIG. 13) of the alternating touch means 26 may include the power supply unit or the charging unit. The power supply unit may include a battery or a chargeable battery. The charging unit detects the rising edge or the falling edge of the alternating voltage applied to the equivalent capacitor between lines Ceq or the compensation capacitor Cba1 to charge a voltage in the capacitor included in the charging unit. Therefore, when the charging unit is used, the alternating touch means 26 is preferably close to the touch detection sensor 10.

The alternating voltage is an alternating voltage like a square wave, a triangular wave, a sine wave, etc. The alternating voltage generator 42 (FIG. 13) may include a means for determining a magnitude or an alternating frequency of the alternating voltage. The magnitude of the alternating voltage may be determined depending on the change in resistance value of variable resistor. Further, the alternating frequency may also be determined depending on the change in a variable resistor, a variable capacitor, etc. The alternating voltage may be formed by the correlation between a primary coil and a secondary coil or may be generated by a combination of a linear circuit such as OPAMP included in the alternating voltage generator 42 (FIG. 13) and circuit parts such as a resistor R and a capacitor C.

According to one embodiment, the alternating touch means 26 may include a means for turning on or off an alternating voltage. For example, when the touch pen is used as the alternating touch means 26, if a push switch installed at a lower portion of the touch pen is pressed, the alternating voltage may not be generated and if the push switch is not pressed, the alternating voltage may be generated. A position of the push switch may be installed at any portion of the touch pen and therefore it is recognized by those skilled in the art that the position of the push switch and the generation of the alternating voltage are not limited to the above-mentioned embodiment.

The touch capacitance Ct is formed between the touch detection sensor 10 and the alternating touch means 26 based on the above Equation 4. When the magnitude of high voltage of the alternating voltage of the alternating touch means 26 is set to be Vph and the magnitude of low voltage is set to be Vpl, the magnitude of alternating voltage is determined as Vph-Vpl. When the Ct is formed by the alternating touch means 26, the magnitude of voltage detected by the touch detector 14 is determined by the following <Equation 7>.

$$Vsensor(pen) = (Vph - Vpl)\frac{Ct}{Ceq + Cvcom + Cp + Ct} \quad \text{[Equation 7]}$$

When the illustrated compensation capacitor Cba1 is included in the embodiment illustrated in FIG. 16, the Cba1 will be additionally included in a denominator of the above <Equation 7>. The above <Equation 7> is a voltage detected by the touch detector 14 when only the alternating voltage of the alternating touch means 26 is applied to the Ct. Therefore, the alternating voltage is not applied to the Ceq, the Cba1, etc., or the alternating voltage applied to the Ceq or the Cba1 is applied avoiding the rising edge or the falling edge. To generate the alternating voltage of the alternating touch means 26 while avoiding the alternating voltage applied to the Ceq or the Cba1, the alternating touch means 26 may further include a means (not illustrated) for detecting a rising edge or a falling edge of voltage formed in the touch detection sensor 10. Further, the alternating touch means 26 may detect the touch signal in a DC section of the alternating voltage applied to the Ceq or the Cba1 or a region in which the alternating voltage is not applied by using a frequency quickly than the alternating voltage applied to the Ceq or the Cba1.

When the CT is not present between the alternating touch means 26 and the touch detection sensor 10, the Equation obtaining the detected voltage is the above <Equation 1> or <Equation 5> and therefore the touch signal of the alternating touch means 26 is detected by the difference between the first voltage obtained by the above <Equation 1> or <Equation 5> and the second voltage obtained by the above <Equation 7>. Therefore, the present invention may detect the touch by the finger based on the difference between the voltages detected by the above <Equation 1> and <Equation 2> and detect the touch by the finger based on the difference between the voltages detected by the above <Equation 5> and <Equation 6>. In this case, the used touch means is the non-alternating touch means (touch means which itself generates and does not output the alternating voltage) as the finger 25 (FIG. 12).

Meanwhile, when the alternating voltage is applied to one side of the equivalent capacitor between lines Ceq, if the touch is not generated, it is possible to detect whether the touch is generated by the alternating touch means 26, based on the difference between the magnitude of first voltage detected by the touch detector 14 based on the above <Equation 1> and the magnitude of second voltage detected by the touch detector 14 based on the above <Equation 7> by the alternating touch means 26. Further, when the alternating voltage is applied to the equivalent capacitor between lines Ceq and one side of the compensation capacitor Cba1, it is possible to detect whether the touch is generated by the alternating touch means 26, based on the difference between the magnitude of first voltage detected by the touch detector 14 based on the above <Equation 5> and the second voltage detected by the touch detector 14 based on the above <Equation 7> by the alternating touch means 26.

According to the embodiment of the present invention, the touch signals may be simultaneously detected by the non-alternating touch means (for example, finger 25 (FIG. 12)) and the alternating touch means (touch pen 26 (FIG. 16)). The reason is that the magnitude of voltage detected in the state in which the non-alternating touch means or the alternating touch means does not contact the touch detection sensor 10, that is, the state in which the Ct is not formed is detected based on the above <Equation 1> or <Equation 5>. Therefore, it is possible to detect the touch by the non-alternating touch means (for example, finger 25 (FIG. 12)) by using the difference between the voltage detected based on the above <Equation 1> or <Equation 5> and the voltage detected based on the <Equation 2> or <Equation 6> and it is possible to detect the touch by the alternating touch means 26 (FIG. 12) by using the difference between the voltage detected based on the above <Equation 1> or <Equation 5> and the voltage detected based on the above <Equation 7>. The voltage detected based on the above <Equation 7> may be differentiated from the magnitude of voltage detected by the above <Equation 2> or <Equation 6> by making the magnitude of Vph-Vpl different and therefore the touch detector 14 may confirm it is the alternating touch means 26 (FIG. 12) or the non-alternating touch means 25 (FIG. 12) by using the difference between the detection voltages.

Meanwhile, referring back to FIG. 13, according to the embodiment of the present invention, the touch detection sensor 10 may detect the touch signal by any combination of the touch detection sensors 10 included in the Row direction based on the touch drive IC (TDI) 30. According to the detailed first example of the combination of the touch detection sensors 10, all the touch detection sensors 10 included in one Row1 are simultaneously operated to detect the touch signal, similar to that all of the five touch detection sensors 10 included in Row1 are simultaneously operated to detect the touch signal. According to the detailed second example of the combination of the touch detection sensors 10, only even columns Col2/Col4 included in the Row1 may be operated to detect the touch signal or only the odd columns Col1/Col3/Col5 may be operated to detect the touch signal. According to the detailed third example of the combination of the touch detection sensors 10, the touch detection sensor 10 of 50% in any Row detects the touch signal or the touch detection sensor 10 of 50% does not detect the touch signal and after the operation of the touch detection sensor 10 of 50% which performs the touch detection is completed, the touch detection sensor 10 of the remaining 50% which does not detect the touch signal may be configured to detect the touch signal. According to the embodiment of the present invention, the touch detection means may further include a means for selecting the plurality of touch detection sensors 10 included in one Row to determine whether to detect the touch signal. According to the foregoing embodiment, the operation of detecting the touch signal means that the touch detection sensor 10 connected to the sensor signal line 22 is connected to the charging means 12 and the touch detector 14 to detect the voltage for touch signal detection.

FIG. 17 is a diagram illustrating an embodiment of the setting of a touch detection sensor 10 and a sensor signal line 22. Referring to FIG. 17, the touch detection sensor 10 and the sensor signal line 22 are included in a square which is partitioned into Row and Column. According to the embodiment, an area of the virtual square which is partitioned into a Row and a Column in which the touch detection sensor 10 and the second signal line 22 are included. According to another embodiment, an outer area in a column direction like Column 5 or Column 1 or an outer area in a row direction like Row 1 or Row 6 may be smaller or larger than an area of a central portion of the square which is virtually partitioned. When the area of the virtual square of the outer portion of a column or a row is small and the touch detection sensor 10 and the sensor signal line 22 are disposed in the square, detection resolution is better and therefore detection power at the outer portion of the touch screen panel 50 is improved. According to the embodiment of the present invention, the area of the touch detection sensor 10 positioned at the outer portion of the touch screen panel 50 may be configured to be smaller than that of the touch detection sensor 10 positioned at the central portion of the touch screen panel 50. According to another embodiment of the present invention, areas of the rest virtual squares other than the virtual square positioned at the outer portion of the touch screen panel 50 may be the same. Further, according to the present invention, one virtual square includes one touch detection sensor 10.

Referring back to FIG. 17, the Row1 includes one touch detection sensor 10 and one sensor signal line 22, but like the Row 2 and the Row3, as the sensor signal line approaches the TDI 30, the more sensor signal lines 22 are included in the virtual square. As such, according to the present invention, the virtual square may include one sensor signal line and the plurality of sensor signal lines 22. When the virtual square includes the plurality of sensor signal lines 22, as the touch detection sensor 10 includes the more sensor signal lines 22, the area of the touch detection sensor 10 is getting smaller. For example, the area of the touch detection sensor 10 having coordinates of the Row1/Col1 is smaller than that of the touch detection sensor 10 having coordinates of the Row6/Col1. This means that the touch detection sensor 10 positioned to be closer to the TDI than the touch detection sensor 10 positioned to be at a long distance from the TDI has a smaller area.

Meanwhile, the resistance of the sensor signal line 22 connected to the touch detection sensor 10 positioned to be at a long distance from the TDI is larger than that of the sensor signal line 22 connected to the touch detection sensor 10 positioned to be closer to the TDI and therefore the detection time of the voltage detected by the touch detector 14 is delayed. Therefore, to reduce the resistance of the sensor signal line 22 connected to the touch detection sensor 10 positioned to be at a long distance from the TDI, a wiring width of the sensor signal line 22 is preferably wide. According to the embodiment of the present invention, the width of the sensor signal line connected to the touch detection sensor 10 positioned at a long distance from the TDI is wider than that of the sensor signal line 22 connected to the touch detection sensor 10 positioned to be close to the TDI.

According to the embodiment of the present invention, the area of the touch detection sensor 10 is changed depending on the distance from the TDI and therefore the value of the area detected by the touch means 25 is changed. A relative ratio of the area value is determined for each Row and therefore the area size detected independent of the area of the touch detection sensor 10 may be equal by compensating for the area detected based thereon. For example, suppose that the size of the area detected in the Row1 by any touch means 25 is 100 and the size of the area detected in the Row6 is 50, only 50% of the area detected in the Row1 is used as the touched area but the area detected in the Row6 increases twice, which may be used as the detected touch area. The present invention may include a means for compensating for a touched area to make the touched area to be equal based on the position and the area of the touch detection sensor 10.

As marked by the Col5 of FIG. 17, the embodiment of the present invention may have the same area of the touch detection sensor 10.

According to the embodiment of the present invention, the touch detection sensor 10 or the sensor signal line 22 may be positioned at an outside of an active area of the display device displayed by a dotted line in FIG. 17. In this configuration, the touch coordinate detection power is improved at the outer portion of the active area of the display device.

Meanwhile, the mutual opposing area between the sensor signal lines 22 connected to the touch detection sensors 10 at a long distance from the TDI is larger than the mutual opposing area between the sensor signal lines 22 connected to the touch detection sensors 10 at a close distance from the TDI and therefore the magnitude of the stray capacitance Cp affecting the sensor signal line 22 connected to the touch detection sensor 10 at a long distance from the TDI is larger. The size of the equivalent capacitance between lines Ceq has a difference due to the stray capacitance and therefore referring to the <Equation 2> or <Equation 6>, the voltage detected by the touch detector 14 has a difference due to the difference in magnitude of the Cp. To solve the above problem, the distance between the sensor signal lines 22 connected to the touch detection sensors 10 at the long distance from the TDI is preferably formed to be more spaced apart from each other and as the mutual opposing distance of the sensor signal line 22 may be more spaced apart from each other, the magnitude of Cp derived from the <Equation 3> or the <Equation 4> is small. According to the embodiment of the present invention, the spaced distance between the sensor signal lines 22 connected to the touch detection sensors 10 at a long distance from the TDI is wider than that between the sensor signal lines 22 connected to the touch detection sensors 10 positioned to be close to the TDI.

The touch detection sensors 10 disposed in the Row1 and the Row2 are disposed at upper and lower portions based on the TDI 30 like being spaced apart from each other by a predetermined distance "d" and the touch detection sensors 10 between which the sensor signal line 22 does not pass through needs to be spaced apart from each other at a predetermined distance. The touch detection sensors 10 are spaced apart from each other at a predetermined distance to prevent the signal interference from occurring therebetween. According to the embodiment, the spaced distance "d" may preferably range from 1 μm to 5000 um.

FIG. 18 is a diagram illustrating an embodiment of a form of the touch detection sensor for improving touch coordinates. The touch detection sensor in FIG. 17 is formed in a virtual square and the corresponding coordinates are equally detected even though any point within the square is touched. As a modification thereof, referring to FIG. 18, the touch detection sensors are opposite to each other, having a geographical form having inflection points or flexural parts between the Rows disposed in a vertical direction based on the TDI. For example, referring to the Col1 of the Row1 and the Row2, the bonded portions between the two touch detection sensors 10 which are opposite to each other are opposite to each other in a triangular form. In the case of the touch means 25 which is positioned in the Row2/Col1 of FIG. 17, the coordinates in the vertical direction are the same even though the touch means is positioned anywhere within the virtual square of FIG. 17. To more accurately determine the coordinates in the vertical direction of the touched position, the touch means needs to contact at least two touch detection sensors 10 but the touch means contacts only the one touch detection sensor 10 in the virtual square (embodiment of FIG. 17). However, referring to the Row2/Col1 of FIG. 18, even though the touch means 25 is at the same position as FIG. 17, the touch means 25 contacts the touch detection sensor 10 at the upper end Row1/Col1 and the touch detection sensor 10 at the Row2/Col1 together. As such, when the opposing surface of the touch detection sensors 10 vertically opposing to each other based on the TDI has a triangular form, a squared form, or a trapezoidal form (Col3 of FIG. 18) having the inflection point and the touch means 25 passes through the opposing inflection points to contact at least two touch detection sensors 10, it is possible to more accurately detect the coordinates in the vertical direction by the touch means 25.

The Col2 of FIG. 18 has a diamond-shaped touch detection sensor 10 by adjusting a distance between vertexes of the Col1 of FIG. 18. "L" of the Col2 of FIG. 18, that is, a distance between the inflection points having the longest length of the touch detection sensors 10 opposite to each other, having the inflection point is about 5% to 300% of a longitudinal (vertical based on the TDI) length of the virtual square set in FIG. 17. As such, when the two touch detection sensors 10 are opposite to each other in a vertical direction, the shape of the opposing inflection points has a triangular form, a sine wave form, a square form, a trapezoidal form, etc., without any limitation and therefore has a form in which the two areas are detected when passing through the virtual opposing surfaces as illustrated in FIG. 17.

"M" of FIG. 18 is a width of the flexural part at which the two touch detection sensors 10 vertically adjacent to each other are opposite to each other. The wider the width, the more the probability that the touch means 25 contacts the two touch detection sensors 10 but the larger the opposing area. As a result, the Cp is increased and thus the touch sensitivity may be reduced. The width of the flexural part defined by the "M" of FIG. 18 at which the two touch detection sensors are opposite to each other may preferably range from 1 mm to 50 mm. Further, in FIG. 18, the flexural part has a triangular form and a point where the opposing gradient of the two touch detection sensors 10 is changed like the triangular vertex is called the inflection point. The number of inflection points may be one or plural and preferably, at least two inflection points may be used.

The gradient of the opposing part is generally changed at the left and right of the inflection points of the two touch detection sensors 10 which are vertically opposite to each other but in some cases, it may be assumed that the opposing part ends without the change of the gradient. For example, in the case of the two touch detection sensors 10 opposite to each other in the triangular form of the Col1 of FIG. 18, the gradient of the triangle rises or falls and then stops at the inflection point, and the shape of the touch detection sensor 10 is completed. In this case, suppose that the number of inflection points is 0.5, like the case in which the number of inflection points ranges from 0.5 numbers to 1.5 numbers or 2.5 numbers, one or a plurality of inflection points are added that is based on an unitized inflection point of 0.5 numbers and thus the opposing area may be determined. In this case, the overall outer area of the touch detection sensor 10 is uniform in each touch detection sensor 10.

Referring back to FIG. 18, when one touch detection sensor 10 is formed having the inflection point or the flexural part, the upper and lower flexural parts are symmetrical to each other. Alternatively, the upper and lower flexural parts may be formed to be asymmetrical to each other. When the upper and lower flexural parts are symmetrical to each other, for example, the vertexes of Col2 of FIG. 18 face each other and when the upper and lower flexural parts are asymmetrical to each other, the vertexes of the Col2 of FIG. 18 mismatch to each other.

FIG. 19 is a diagram illustrating an embodiment of the present invention for improving visibility. Referring to FIG. 19, there are two touch detection sensors 10 vertically opposite to each other based on the TDI and the sensor signal line 22 connected thereto. In some cases, the pattern illustrated in FIG. 17 may appear, which degrades a quality of products. To improve the visibility problem of the pattern, the touch detection sensor is partitioned into plural, only a part of the partitioned region is formed with the pattern, and the formed pattern may be connected to each other. For example, only 50% of the region partitioned in FIG. 19A is formed with the pattern in a delta structure and when the patterns having the formed delta structure are connected to each other, the detection area of the touch detection sensor 10 is reduced to 50% but the visibility is improved. FIG. 19B illustrates an embodiment in which only a part of the region of the sensor signal line 22 is formed with the pattern, in which a dummy pattern 23 is inserted between the touch detection sensor 10 and the sensor signal line 22 and is partitioned to form the patterns only in some region and connect the patterns to each other. As such, the present invention inserts the dummy patterns 23 in the touch detection sensors 10, in the sensor signal lines 22, or between the touch detection sensor 10 and the sensor signal lien 22 and are partitioned into plural and the touch detection sensor 10 is patterned only in a part of the partitioned region to improve the visibility.

FIG. 20 is an embodiment of the present invention of a design of the sensor signal line 22. Referring to FIG. 20, FIG. 20 illustrates the tempered glass which is installed on a front surface of a mobile phone which is a portable device and has a touch. Generally, a side of the tempered glass is inserted with a company logo or is formed with colors such as black or white to improve marketability. The color is called a black matrix (BM) and referring to a front of FIG. 20, a shaded portion is a BM portion. In some region of the BM, the BM is opened to perform an operation of a camera lens, an infrared sensor, etc. When the BM is cut in a direction of A-A', the bottom of the tempered glass is printed with the BM. The BM is ink having colors or non-conductive materials such as organic BM, chromium BM, and silver oxide ($Ag_2O$) are used for BM.

In the case in which the touch detection sensor 10 according to the present invention is embedded in a bottom of the tempered glass, the signal line may be cut due to the step generated by the BM when the sensor signal line 22 passes through the BM. Therefore, referring to a rear of FIG. 20, in the case in which the touch detection sensor 10 and the sensor signal line 22 according to the present invention are installed, the signal line width when the sensor signal line 22 passes through the BM stepped portion is desirably formed to be wider than the width of the sensor signal line 22 just before the BM step. According to one embodiment, when a width 22-1 of the sensor signal line 22 just before the BM stepped portion is 100%, a width 22-2 of the sensor signal line 22 crossing the BM stepped portion may preferably range from 101% to 1000%.

According to the capacitive type touch detection means and the detection method according to the embodiments of the present invention, the alternating driving voltage is applied to the sensing equivalent capacitor formed between the sensing pad and the non-sensing pad adjacent to the sensing pad, the occurrence of the difference in voltage due to the difference in touch capacitance added by the touch input means such as the finger is detected by the touch detector to acquire the touch signal, such that the parasitic capacitance occurring between the sensor signal lines typically acting as noise is reversely used as the touch signal detection means (for example, basic value not affected by the touch signal), thereby facilitating the design of the touch panel and improving the sensitivity.

It will be obvious to those skilled in the art to which the present invention pertains that the present invention described above is not limited to the above-mentioned exemplary embodiments and the accompanying drawings, but may be variously substituted, modified, and altered without departing from the scope and spirit of the present invention.

What is claimed is:

1. A touch detection means comprising:
a plurality of touch detection sensors;
a plurality of sensor signal lines each configured to apply a signal to a corresponding one of the touch detection sensors or receive a signal acquired from the corresponding one of the touch detection sensors; and
a touch detector configured to detect whether a touch is generated by a touch input means based on the acquired signal,
wherein the touch detection sensors are classified into at least one sensing pad and at least one non-sensing pad and the generation of the touch is detected based on a change in a voltage of an equivalent capacitor, the equivalent capacitor indicating one or more of capacitors which are formed between at least one sensing pad sensor signal line connected to the sensing pad and at least one non-sensing pad sensor signal line connected to the non-sensing pad,
wherein the equivalent capacitor includes one or both of a first capacitance between lines and a second capacitance between lines according to a magnitude of a capacitance of the equivalent capacitor, and
wherein the touch detection means further comprises:
a compensation capacitor configured to compensate for a difference between the first capacitance between lines and the second capacitance between lines.

2. The touch detection means of claim 1, further comprising:
a three-terminal switching device configured to charge the touch detection sensor prior to detecting whether the touch is generated,
wherein the three-terminal switching device supplies a charging signal input to an input terminal by a control signal supplied to a control terminal to the touch detection sensor connected to an output terminal to charge the touch detection sensor, and
wherein a charging time is determined by adjusting a turn on time of the control signal of the three-terminal switching device, and an alternating voltage is applied to the equivalent capacitor after the touch detection sensor is charged.

3. The touch detection means of claim 1, further comprising:
a charging means configured to charge the first capacitance between lines and the second capacitance between lines with a precharge signal having the same voltage prior to detecting whether the touch is generated,
wherein the second capacitance between lines and the first capacitance between lines vary by adjusting a distance between the sensing pad sensor signal line and the non-sensing pad sensor signal line.

4. The touch detection means of claim 1, wherein the touch is detected by using one of the first capacitance between lines and the second capacitance between lines at the time of detecting whether the touch is generated,
wherein when the generation of the touch is detected using the first capacitance between lines, and
wherein the non-sensing pad sensor signal line participating in the formation of the second capacitance between lines keeps a floating state or a high impedance state.

5. The touch detection means of claim 1, wherein the touch detection sensor, the sensing pad sensor signal line, and the non-sensing pad sensor signal line are formed using the same mask, and
wherein a width of the sensor signal line is differently formed depending on a position of the touch detection sensor.

6. The touch detection means of claim 1, wherein a first side of the compensation capacitor is connected to the touch detector and receives the same alternating voltage as an alternating voltage through a second side of the compensation capacitor, or the first side of the compensation capacitor is connected to the touch detector and receives an alternating voltage different from an alternating voltage through the second side of the compensation capacitor.

7. The touch detection means of claim 6, wherein when the touch is not sensed by the touch detection sensor, a voltage sensed by the touch detector is calculated by the following Equation 1:
the following Equation is $$Vsensor_{nontouch} = Vpre + (Vh - Vl)\frac{Ceq + Cbal}{Ceq + Cabl + Cvcom + Cp}$$

$$Vsensor_{nontouch} = V_{pre} + (V_h - V_l)\frac{C_{eq} + C_{bal}}{C_{eq} + C_{bal} + C_{vcom} + C_p},$$

where, $Vsensor_{nontouch}$ represents the voltage detected by the touch detector when the touch is not made, $V_{pre}$ represents a charging voltage of the touch detection sensor, $V_h$ represents a high level voltage of the alternating voltage applied to the non-sensing pad sensor signal line and the compensation capacitor, $V_l$ represents a low level voltage of the alternating voltage applied to the non-sensing pad sensor signal line and the compensation capacitor, Ceq represents a capacitance of the equivalent capacitor, Cba1 represents a capacitance of the compensation capacitor, Cvcom represents a capacitance of a common electrode capacitor formed between the touch detection sensor and a common electrode applying a common voltage to a display device including the touch detection sensor, Cp represents a parasitic capacitance generated by the touch detection means, a polarity of $V_h\text{-}V_l$ is positive when the alternating voltage alternates from low to high, and the polarity of $V_h\text{-}V_l$ is negative when the alternating voltage alternates from high to low, and wherein when the touch is sensed by the touch detection sensor, a voltage sensed by the touch detector is calculated by the following Equation 2:

the following Equation 2 is $$Vsensor_{touch} = Vpre + (Vh - Vl)\frac{Ceq + Cbal}{Ceq + Cbal + Cvcom + Cp + Ct},$$

where, $Vsensor_{touch}$ represents the voltage detected by the touch detector when the touch is generated, and Ct represents a capacitance of a touch capacitor formed by the touch detection sensor and the touch of the touch input means.

8. The touch detection means of claim 6, wherein the determination on whether the touch is generated by the touch detector is based on a difference between a voltage acquired by the following Equation 1 and a voltage acquired by the following Equation 2 the following Equation 1 is $$Vsensor_{nontouch} = Vpre + (Vh - Vl)\frac{Ceq + Cbal}{Ceq + Cabl + Cvcom + Cp}$$

and,
the following Equation 2 is $$Vsensor_{touch} = Vpre + (Vh - Vl)\frac{Ceq + Cbal}{Ceq + Cbal + Cvcom + Cp + Ct},$$

where, $Vsensor_{nontouch}$ represents the voltage detected by the touch detector 14 when the touch is not made, $Vsensor_{touch}$ represents the voltage detected by the touch detector 14 when the touch is generated, $V_{pre}$ represents a charging voltage of the touch detection sensor, $V_h$ represents a high level voltage of the alternating voltage applied to the non-sensing pad sensor signal line and the compensation capacitor, $V_l$ represents a low level voltage of the alternating voltage applied to the non-sensing pad sensor signal line and the compensation capacitor, Ceq represents a capacitance of the equivalent capacitor, Cba1 represents a capacitance of the compensation capacitor, Cvcom represents the capacitance of a common electrode capacitor formed between the touch detection sensor and a common electrode applying a common voltage to a display device including the touch detection sensor, Cp represents a parasitic capacitance generated by the touch detection means, Ct represents a capacitance of a touch capacitor formed by the touch detection sensor and the touch of the touch input means, a polarity of $V_h\text{-}V_l$ is positive when the alternating voltage alternates from low to high, and the polarity of $V_h\text{-}V_l$ is negative when the alternating voltage alternates from high to low.

9. The touch detection means of claim 6, wherein the touch detector detects whether the touch is generated in synchronization with a rising edge of the alternating voltage or a falling edge of the alternating voltage, and wherein the touch detector detects whether the touch is generated at a predetermined time interval from a rising edge of the alternating voltage or a falling edge of the alternating voltage.

10. The touch detection means of claim 1, wherein bonded parts between adjacent touch detection sensors face each other, each of the bonded parts having a geometrical shape that has at least one inflection point or a flexural part, and wherein the touch detection sensor is partitioned into a plurality of areas, only a part of the partitioned areas is provided with predetermined patterns, and the formed patterns are connected to each other.

11. A touch detection means comprising:
a plurality of touch detection sensors;
a plurality of sensor signal lines each configured to apply a signal to a corresponding one of the touch detection sensors or receive a signal acquired from the corresponding one of the touch detection sensors; and
a touch detector configured to detect whether a touch is generated by a touch input means based on the acquired signal,
wherein the touch detection sensors are classified into at least one sensing pad and at least one non-sensing pad and the generation of the touch is detected based on a change in a voltage of an equivalent capacitor, the equivalent capacitor indicating one or more of capacitors which are formed between at least one sensing pad sensor signal line connected to the sensing pad and at least one non-sensing pad sensor signal line connected to the non-sensing pad,
wherein the generation of the touch is detected in a state in which an alternating voltage is applied to the equivalent capacitor and the alternating voltage is applied through the non-sensing pad sensor signal line,
wherein a magnitude of the alternating voltage varies, and
wherein a gradient of a rising edge or a falling edge of the alternating voltage varies.

12. The touch detection means of claim 11, further comprising:
a touch capacitor configured to be formed by the touch detection sensor and the touch of the touch input means; and
a common electrode capacitor Cvcom configured to be formed between the touch detection sensor and a common electrode applying a common voltage to a display device including the touch detection sensor.

13. The touch detection means of claim 12, wherein when the touch is not sensed by the touch detection sensor, the voltage sensed by the touch detector is calculated by the following Equation 1:

the following Equation 1 is $$Vsensor_{nontouch} = Vpre + (Vh - Vl)\frac{Ceq}{Ceq + Cvcom + Cp},$$

where, $Vsensor_{nontouch}$ represents a voltage detected by the touch detector when the touch is not made, $V_{pre}$ represents a charging voltage of the touch detection sensor, $V_h$ represents a high level voltage of the alternating voltage applied to the non-sensing pad sensor signal line, $V_l$ represents a low level voltage of the alternating voltage applied to the non-sensing pad sensor signal line, Ceq represents a capacitance of the equivalent capacitor, Cvcom represents a capacitance of the common electrode capacitor, Cp represents a parasitic capacitance generated by the touch detection means, a polarity of $V_h$-$V_l$ is positive when the alternating voltage alternates from low to high, and the polarity of $V_h$-$V_l$ is negative when the alternating voltage alternates from high to low, and wherein when the touch is sensed by the touch detection sensor, the voltage sensed by the touch detector is calculated by the following Equation 2:

the following Equation 2 is $$Vsensor_{touch} = Vpre + (Vh - Vl)\frac{Ceq}{Ceq + Cvcom + Cp + Ct},$$

where, $Vsensor_{touch}$ represents the voltage detected by the touch detector when the touch is generated, and Ct represents a capacitance of the touch capacitor.

14. The touch detection means of claim 12, wherein the determination on whether the touch is generated by the touch detector is based on a difference between a voltage acquired by the following Equation 1 and a voltage acquired by the following Equation 2:

the following Equation 1 is $$Vsensor_{nontouch} = Vpre + (Vh - Vl)\frac{Ceq}{Ceq + Cvcom + Cp}$$

and,
the following Equation 2 is $$Vsensor_{touch} = Vpre + (Vh - Vl)\frac{Ceq}{Ceq + Cvcom + Cp + Ct},$$

where, $Vsensor_{nontouch}$ represents the voltage detected by the touch detector when the touch is not made, $Vsensor_{touch}$ represents the voltage detected by the touch detector when the touch is generated, $V_{pre}$ represents a charging voltage of the touch detection sensor, $V_h$ represents a high level voltage of the alternating voltage applied to the non-sensing pad sensor signal line, $V_l$ represents a low level voltage of the alternating voltage applied to the non-sensing pad sensor signal line, Ceq represents a capacitance of the equivalent capacitor, Cvcom represents a capacitance of the common electrode capacitor, Cp represents a parasitic capacitance generated by the touch detection means, Ct represents a capacitance of the touch capacitor, a polarity of $V_h$-$V_l$ is positive when the alternating voltage alternates from low to high, and the polarity of $V_h$-$V_l$ is negative when the alternating voltage alternates from high to low.

15. A touch detection method comprising:
charging a plurality of touch detection sensors with a predetermined charging voltage using a three-terminal switching device, a touch detection means comprising the plurality of touch detection sensors and the three-terminal switching device;
classifying the plurality of touch detection sensors into at least one sensor pad and at least one non-sensing pad;
forming an equivalent capacitors, the equivalent capacitor indicating one or more of capacitors between at least one sensing pad sensor signal line connected to the sensing pad and at least one non-sensing pad sensor signal line connected to the non-sensing pad; and
applying an alternating voltage to the equivalent capacitor through the non-sensing pad sensor signal line by a touch detector and detecting a touch based on a change in a voltage generated in the equivalent capacitor according to whether the touch is generated by a touch input means,
wherein the equivalent capacitor includes one or both of a first capacitance between lines and a second capacitance between lines according to a magnitude of a capacitance of the equivalent capacitor, and
wherein the touch detection mean further comprises:
a compensation capacitor configured to compensate for a difference between the first capacitance between lines and the second capacitance between lines.

16. The touch detection method of claim 15, wherein the classification of the plurality of touch detection sensors is sequentially determined based on a defined order.

17. The touch detection method of claim 15, wherein when the touch is not sensed by the touch detection sensor, a voltage sensed by the touch detector is calculated by the following Equation 1:

the following Equation 1 is $$Vsensor_{nontouch} = Vpre + (Vh - Vl)\frac{Ceq}{Ceq + Cvcom + Cp},$$

where, $Vsensor_{nontouch}$ represents the voltage detected by the touch detector when the touch is not made, $V_{pre}$ represents a charging voltage of the touch detection sensor, $V_h$ represents a high level voltage of the alternating voltage applied to the non-sensing pad sensor signal line, $V_l$ represents a low level voltage of the alternating voltage applied to the non-sensing pad sensor signal line, Ceq represents a capacitance of the equivalent capacitor, Cvcom represents the capacitance of a common electrode capacitor formed between the touch detection sensor and a common electrode applying a common voltage to a display device including the touch detection sensor, Cp represents a parasitic capacitance generated by a touch detection means, a polarity of $V_h$-$V_l$ is positive when the alternating voltage alternates from low to high, and the polarity of $V_h$-$V_l$ is negative when the alternating voltage alternates from high to low, and wherein when the touch is sensed by the touch detection sensor, the voltage sensed by the touch detector is calculated by the following Equation 2:

the following Equation 2 is $$Vsensor_{touch} = Vpre + (Vh - Vl)\frac{Ceq}{Ceq + Cvcom + Cp + Ct},$$

where, $Vsensor_{touch}$ represents the voltage detected by the touch detector 14 when the touch is generated, and Ct represents a capacitance formed by the touch detection sensor and the touch of the touch input means.

18. The touch detection method of claim 15, wherein the determination on whether the touch is generated by the touch detector is based on a difference between a voltage acquired by the following Equation 1 and a voltage acquired by the following Equation 2:

the following Equation 1 is $$Vsensor_{nontouch} = Vpre + (Vh - Vl)\frac{Ceq}{Ceq + Cvcom + Cp}$$

and,
the following Equation 2 is $$Vsensor_{touch} = Vpre + (Vh - Vl)\frac{Ceq}{Ceq + Cvcom + Cp + Ct},$$

where, $Vsensor_{nontouch}$ represents the voltage detected by the touch detector when the touch is not made, $Vsensor_{touch}$ represents the voltage detected by the touch detector when the touch is generated, $V_{pre}$ represents a charging voltage of the touch detection sensor, $V_h$ represents a high level voltage of the alternating voltage applied to the non-sensing pad sensor signal line, $V_l$ represents a low level voltage of the alternating voltage applied to the non-sensing pad sensor signal line, Ceq represents a capacitance of the equivalent capacitor, Cvcom represents a common electrode capacitance formed between the touch detection sensor and a common electrode applying a common voltage to a display device including the touch detection sensor, Cp represents a parasitic capacitance generated by a touch detection means, Ct represents a capacitance formed by the touch detection sensor and the touch of the touch input means, a polarity of $V_h$-$V_l$ is positive when the alternating voltage alternates from low to high, and the polarity of $V_h$-$V_l$ is negative when the alternating voltage alternates from high to low.

* * * * *